(12) United States Patent
Wileniec et al.

(10) Patent No.: US 10,285,323 B2
(45) Date of Patent: May 14, 2019

(54) AGRICULTURAL TILLAGE IMPLEMENT FOLD SEQUENCE CONTROL

(71) Applicant: CNH Industrial America LLC, New Holland, PA (US)

(72) Inventors: Mark J. Wileniec, Saskatoon (CA); Kena Shah, Woodridge, IL (US); Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 90 days.

(21) Appl. No.: 15/087,125

(22) Filed: Mar. 31, 2016

(65) Prior Publication Data
US 2016/0212928 A1    Jul. 28, 2016

Related U.S. Application Data

(63) Continuation-in-part of application No. 14/532,563, filed on Nov. 4, 2014, now Pat. No. 9,622,400.

(60) Provisional application No. 61/903,492, filed on Nov. 13, 2013.

(51) Int. Cl.
*A01B 73/04* (2006.01)
(52) U.S. Cl.
CPC .................................. *A01B 73/046* (2013.01)
(58) Field of Classification Search
CPC ......... A01B 63/16; A01B 63/32; A01B 73/02; A01B 73/04; A01B 73/044; A01B 73/046

USPC .................. 172/311, 315, 452, 459, 468, 663
See application file for complete search history.

(56) References Cited

U.S. PATENT DOCUMENTS

| 4,171,726 | A |   | 10/1979 | Ward |
|---|---|---|---|---|
| 4,206,816 | A |   | 6/1980 | Richardson et al. |
| 4,249,616 | A |   | 2/1981 | Moe |
| 4,320,805 | A |   | 3/1982 | Winter |
| 4,346,763 | A | * | 8/1982 | Swanson ................. A01B 63/32 172/2 |
| 4,354,688 | A | * | 10/1982 | Swanson ................. A01B 63/22 137/101.21 |
| 4,373,590 | A | * | 2/1983 | Wittrock ............... A01B 33/021 172/103 |
| 4,407,109 | A | * | 10/1983 | Swanson ................. A01D 57/02 137/99 |
| 4,449,590 | A |   | 5/1984 | Williamson |
| 4,467,875 | A |   | 8/1984 | Lewison |
| 5,379,847 | A |   | 1/1995 | Snyder |

(Continued)

*Primary Examiner* — Gary S Hartmann
(74) *Attorney, Agent, or Firm* — Rebecca L. Henkel; Rickard K. DeMille

(57) ABSTRACT

An agricultural tillage implement with a hydraulic system having a left wing hydraulic subsystem with an outer left wing hydraulic circuit supplying hydraulic pressure and flow to an actuator for actuating an actuator of an outer left wing folding implement section, and a right wing hydraulic subsystem having an outer right wing hydraulic circuit for actuating the actuator of an outer right wing implement section; the hydraulic system additionally having a hydraulic flow divider dividing hydraulic flow and pressure between the outer left wing hydraulic circuit and the outer right wing hydraulic circuit, the hydraulic flow divider being configured to coordinate the motion of the outer left wing section and the outer right wing section.

10 Claims, 22 Drawing Sheets

(56) References Cited

U.S. PATENT DOCUMENTS

| | | | | |
|---|---|---|---|---|
| 5,449,042 A * | 9/1995 | Landphair | A01B 73/065 | 172/311 |
| 5,957,218 A | 9/1999 | Noonan et al. | | |
| 5,992,534 A | 11/1999 | Callies et al. | | |
| 6,092,609 A | 7/2000 | Jeffery et al. | | |
| 6,402,051 B1 * | 6/2002 | Humpal | A01B 73/02 | 239/165 |
| 6,675,907 B2 * | 1/2004 | Moser | A01B 63/32 | 111/121 |
| 6,684,962 B1 * | 2/2004 | Lewallen | A01B 63/22 | 111/57 |
| 7,467,668 B2 | 12/2008 | Kimball | | |
| 7,478,683 B2 | 1/2009 | Peck et al. | | |
| 8,176,992 B2 * | 5/2012 | Yuen | A01B 73/048 | 172/311 |
| 8,408,326 B2 * | 4/2013 | Yuen | A01B 73/048 | 172/456 |
| 8,636,078 B2 * | 1/2014 | Yuen | A01B 73/048 | 172/311 |
| 8,646,543 B2 * | 2/2014 | Yuen | A01B 73/02 | 172/311 |
| 8,657,023 B2 | 2/2014 | Casper et al. | | |
| 8,776,908 B2 * | 7/2014 | Maro | A01B 73/046 | 172/311 |
| 8,869,909 B2 | 10/2014 | Blunier et al. | | |
| 9,161,488 B2 * | 10/2015 | Blunier | A01B 73/046 | |
| 9,516,798 B2 * | 12/2016 | Sudbrink | A01B 73/065 | |
| 9,596,799 B2 * | 3/2017 | Sudbrink | A01B 73/065 | |
| 9,622,400 B2 * | 4/2017 | Sudbrink | A01B 73/046 | |
| 9,872,422 B2 * | 1/2018 | Sudbrink | A01B 63/14 | |
| 9,974,224 B2 * | 5/2018 | Sudbrink | A01B 73/046 | |
| 9,986,674 B2 * | 6/2018 | Sudbrink | A01B 63/22 | |
| 9,999,171 B2 * | 6/2018 | Magarity | A01B 73/046 | |
| 9,999,172 B2 * | 6/2018 | Sudbrink | A01B 3/26 | |
| 2013/0032365 A1 | 2/2013 | Houck | | |
| 2014/0060861 A1 | 3/2014 | Blunier | | |
| 2016/0205862 A1 * | 7/2016 | Sudbrink | A01B 63/22 | |
| 2016/0212927 A1 * | 7/2016 | Sudbrink | A01B 63/32 | |
| 2016/0262301 A1 * | 9/2016 | van Vooren | A01D 41/144 | |
| 2017/0112046 A1 * | 4/2017 | Sudbrink | A01B 73/02 | |
| 2017/0257996 A1 * | 9/2017 | Smyth | A01B 29/02 | |
| 2018/0184573 A1 * | 7/2018 | Hadley | A01B 73/046 | |

* cited by examiner

AGRICULTURAL TILLAGE IMPLEMENT FOLD SEQUENCE CONTROL

CROSS REFERENCE TO RELATED APPLICATIONS

This is a continuation-in-part application based upon U.S. non-provisional patent application Ser. No. 14/532,563, entitled "AGRICULTURAL TILLAGE IMPLEMENT WHEEL CONTROL", filed Nov. 4, 2014, which is a non-provisional of U.S. Provisional Application Ser. No. 61/903,492, entitled "AGRICULTURAL TILLAGE IMPLEMENT WHEEL CONTROL", filed Nov. 13, 2013 which is incorporated herein by reference.

BACKGROUND OF THE INVENTION

1. Field of the Invention

The present invention relates to agricultural implements, and, more particularly, to agricultural tillage implements.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

Tillage equipment prepares the soil by way of mechanical agitation of various types, such as digging, stirring, and overturning. Examples of which include ploughing (overturning with moldboards or chiseling with chisel shanks), rototilling, rolling with cultipackers or other rollers, harrowing, and cultivating with cultivator shanks.

Tillage is often classified into two types, primary and secondary. There is no strict definition of these two types, perhaps a loose distinction between the two is that tillage that is deeper and more thorough is thought of as primary, and tillage that is shallower is thought of as secondary. Primary tillage such as plowing produces a larger subsurface difference and tends to produce a rough surface finish, whereas secondary tillage tends to produce a smoother surface finish, such as that required to make a good seedbed for many crops. Harrowing and rototilling often combine primary and secondary tillage into one operation.

Wheels are often integral with tillage implements and are used for both transportation of the implement, and for depth control of the tillage elements. The prior art includes control systems that raise and lower the wheel assemblies as an entire unit, which can result in interference with components of foldable wing sections as the wing sections are folded.

What is needed in the art is an easy to use system that orchestrates the folding of the implement sections.

SUMMARY OF THE INVENTION

The present invention provides a tillage implement that has several tilling sections with the ability to coordinate the various sections as the sections are being folded.

The invention in one form is directed to an agricultural tillage implement with a hydraulic system having a left wing hydraulic subsystem with an outer left wing hydraulic circuit supplying hydraulic pressure and flow to an actuator for actuating an actuator of an outer left wing folding implement section, and a right wing hydraulic subsystem having an outer right wing hydraulic circuit for actuating the actuator of an outer right wing implement section; the hydraulic system additionally having a hydraulic flow divider dividing hydraulic flow and pressure between the outer left wing hydraulic circuit and the outer right wing hydraulic circuit, the hydraulic flow divider being configured to coordinate the motion of the outer left wing section and the outer right wing section.

An advantage of the present invention is that the implement has a decreased profile in the transport mode.

Another advantage of the present invention is that the control system choreographs the movement of the wing sections to keep the implement balanced.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
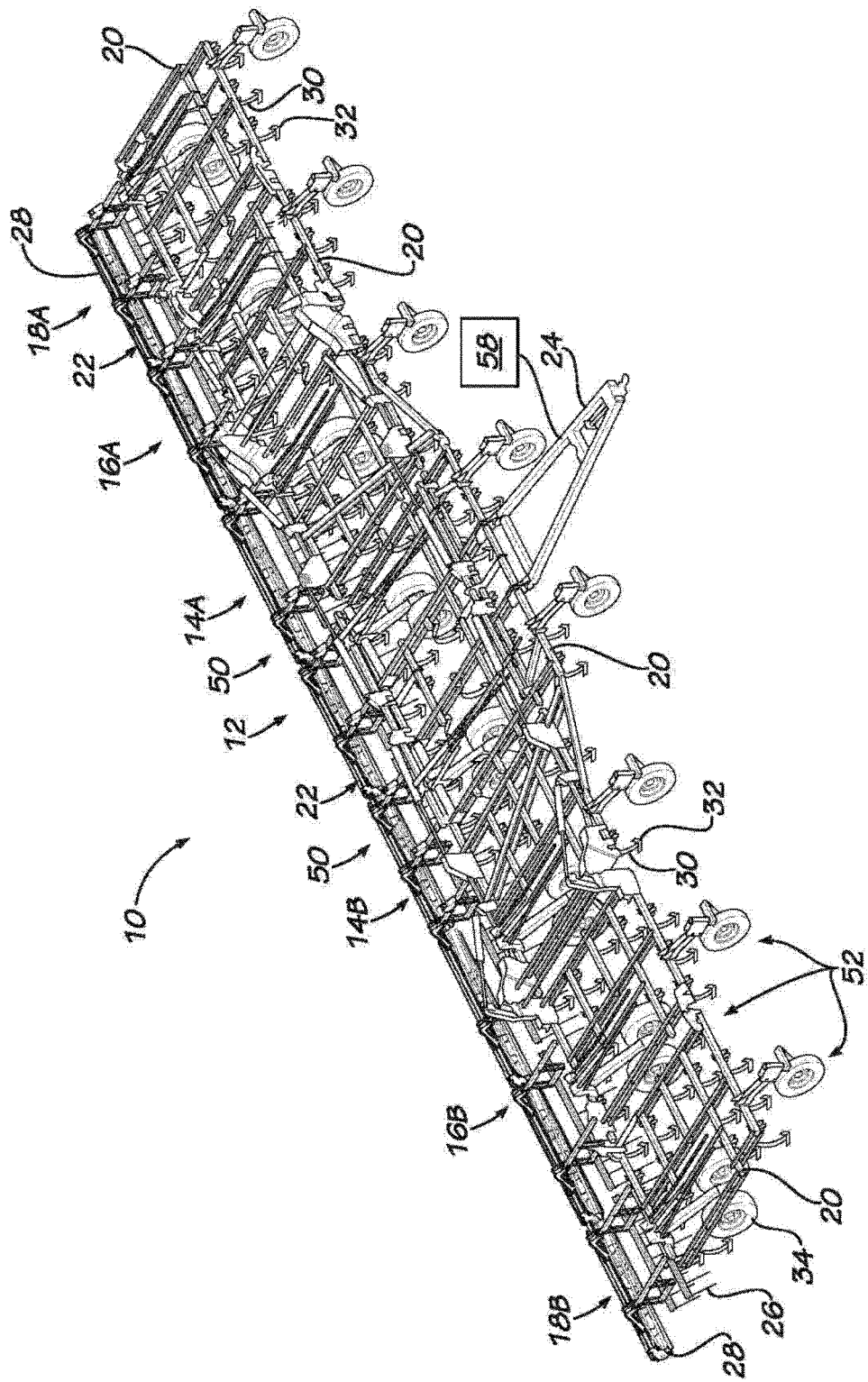
FIG. 1 is a top perspective view of an embodiment of an agricultural tillage implement of the present invention, in the form of a field cultivator, in an unfolded position.

Referring now to the drawings, and more particularly to FIG. 1, there is shown an embodiment of a tillage implement of the present invention. In the illustrated embodiment, the tillage implement is in the form of a field cultivator 10 for tilling and finishing soil prior to seeding.

Field cultivator 10 is configured as a multi-section field cultivator, and includes a center frame section 12, also referred herein as a main section 12, and a plurality of wing sections 14, 16 and 18. In the illustrated embodiment, field cultivator 10 has a triple-fold configuration with three left wings sections designated 14A, 16A and 18A, and three right wing sections designated 14B, 16B and 18B. Wing sections 14A and 14B are each inner wing sections, wing sections 16A and 16B are each middle wing sections, and wing sections 18A and 18B are each outer wing sections.

Center frame section 12 is the center section that is directly towed by a traction unit, such as an agricultural tractor (not shown). Center frame section 12 generally functions to carry a shank frame 20 for tilling the soil, and a rear auxiliary implement 22 for finishing the soil. A pull hitch 24 extends forward from shank frame 20, and is coupled with the traction unit in known manner.

Rear auxiliary implement 22 includes a spring tooth drag 26 and a rolling (aka, crumbler) basket 28 which coact with each other to finish the soil. However, rear auxiliary implement 22 can be differently configured, such as a spike tooth drag, cultivator shanks, etc.

Shank frame 20 generally functions to carry cultivator shanks 30 with shovels 32 at their lower ends for tilling the soil. Rear lift wheels 34 are used for raising and lowering the shank frame 20 with a hydraulic lift cylinder (not specifically visible in FIGS. 1 and 2), and a pair of front gauge wheels 36 are used to level the shank frame 20 during a field operation.

Similarly, each inner wing section 14A and 14B, middle wing section 16A and 16B, and outer wing section 18A and 18B includes a shank frame 20 for tilling the soil, a rear auxiliary implement 22 for finishing the soil, rear lift wheels 34 and front gauge wheels 36. These components are slightly different from but still similar to the like-named components described above with regard to center frame section 12, and are not described in further detail herein.

Figure 3:
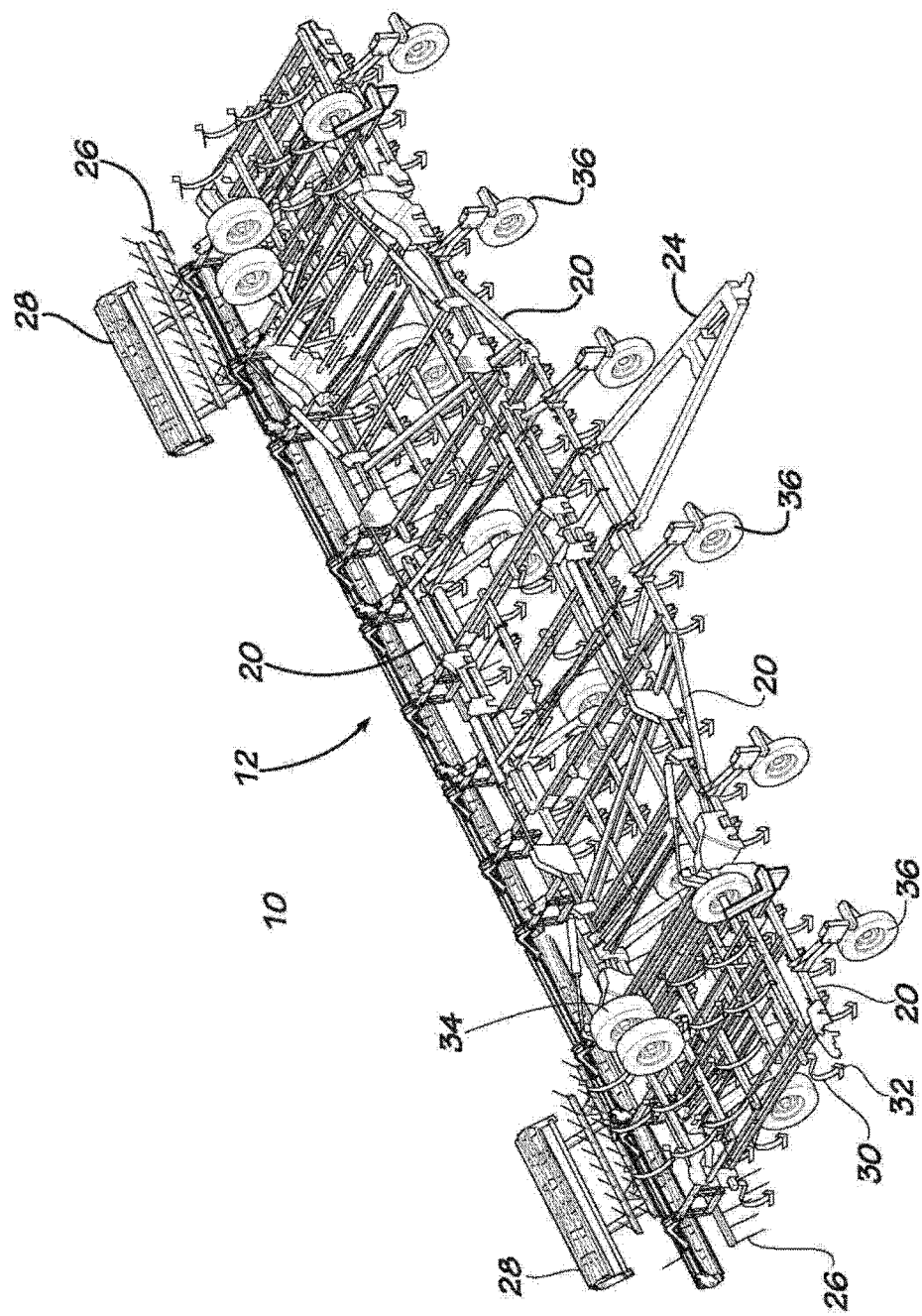
FIG. 3 is a top perspective view of the field cultivator shown in FIGS. 1-2, with the outer wing sections folded to a transport position.
Figure 4:
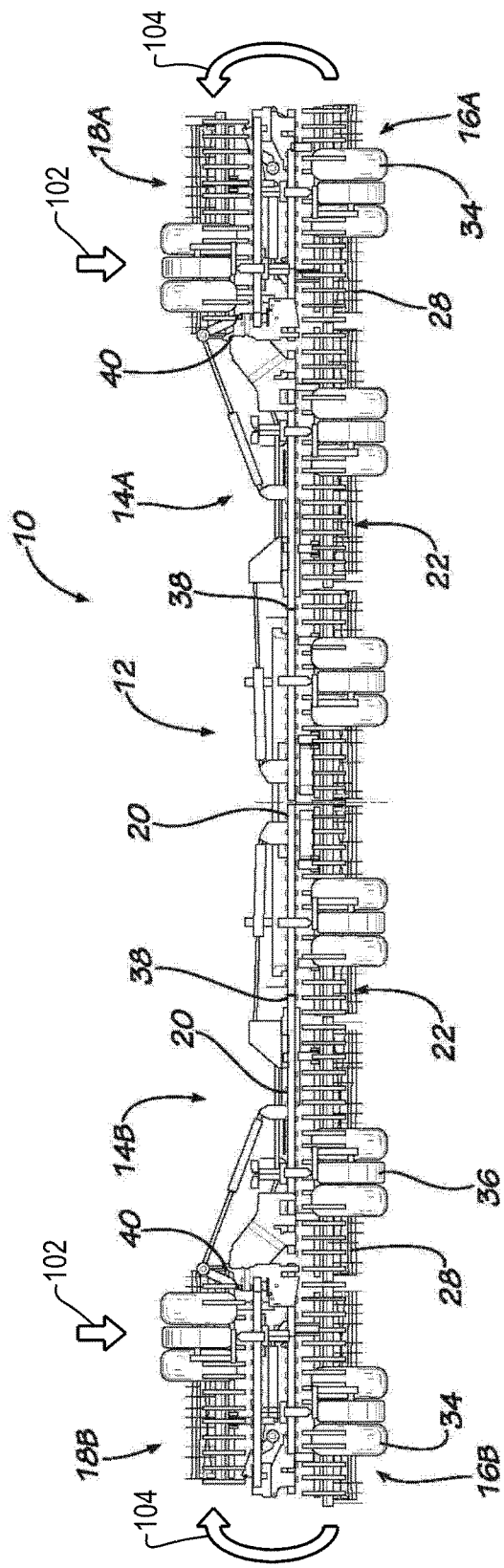
FIG. 4 is a front view of the field cultivator shown in FIG. 3, with the outer wing sections folded to the transport position.
Figure 5:
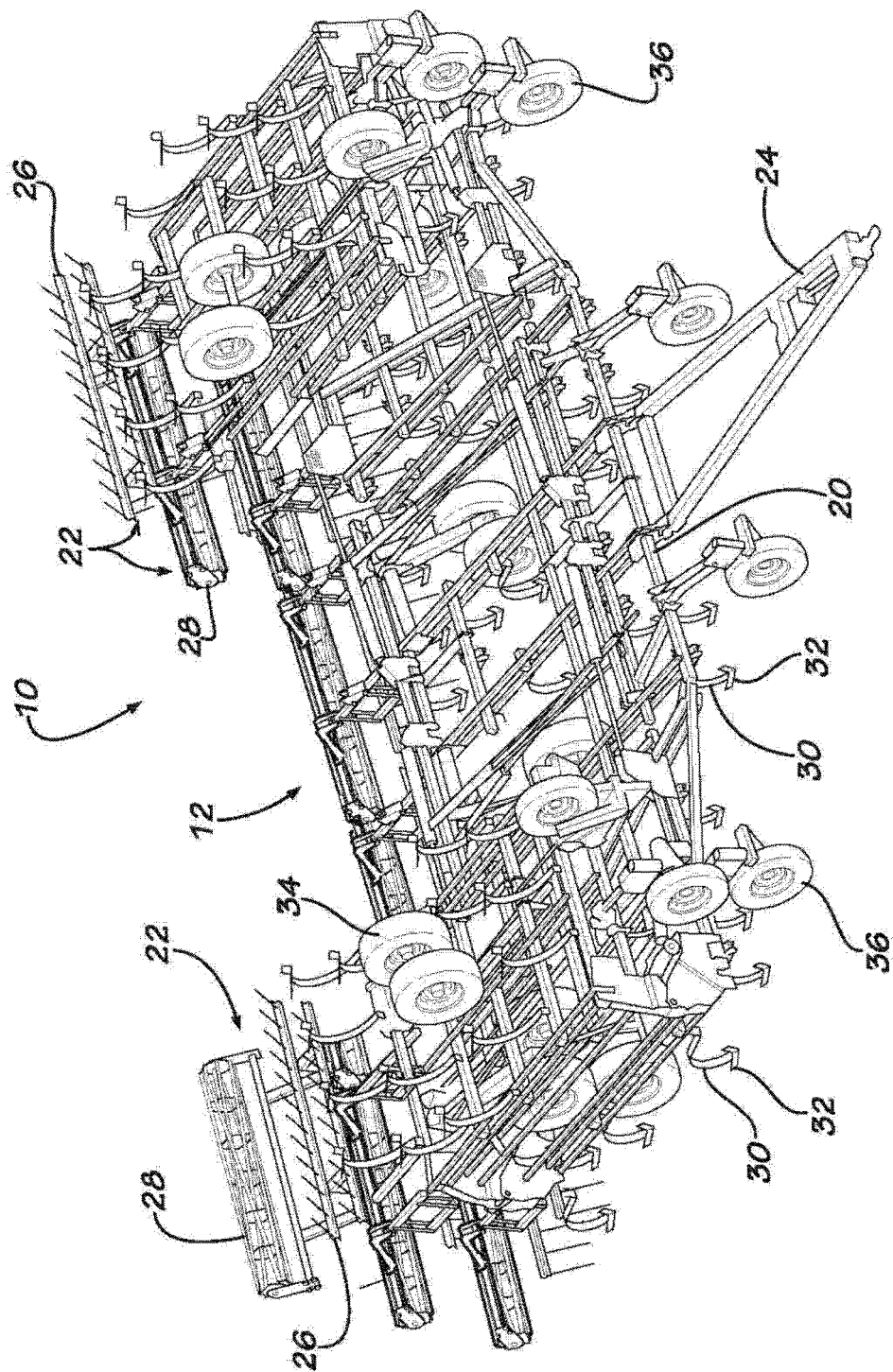
FIG. 5 is a top perspective view of the field cultivator shown in FIGS. 1-4, with the middle wing sections folded to a transport position.
Figure 6:
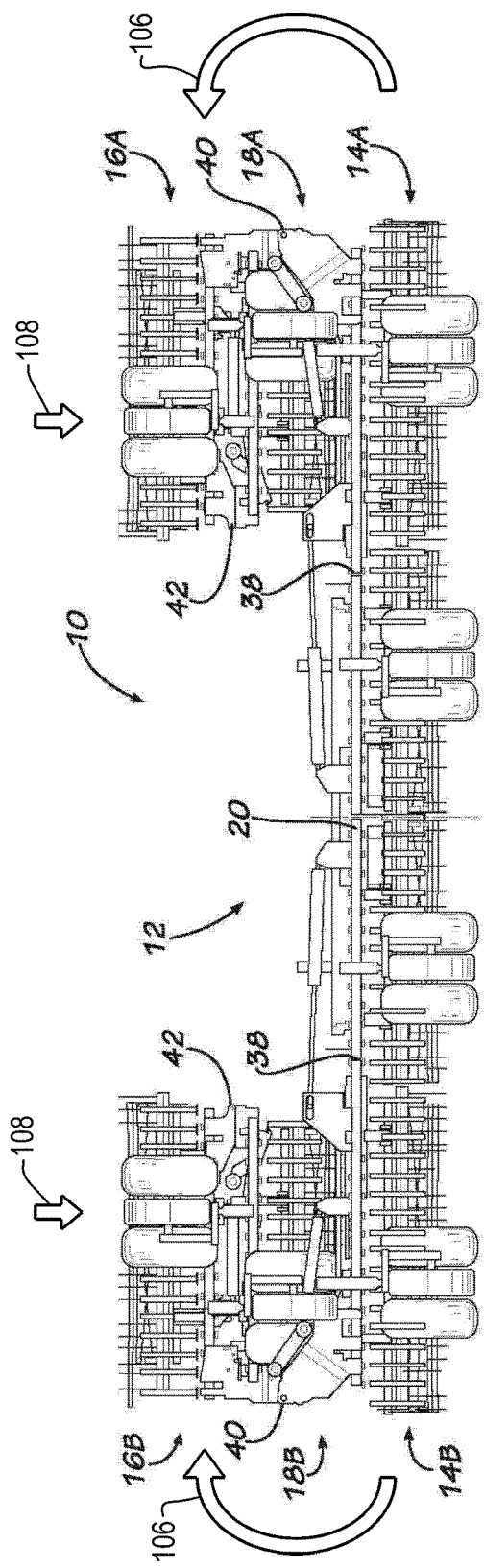
FIG. 6 is a front view of the field cultivator shown in FIG. 5, with the middle wing sections folded to the transport position.
Figure 7:
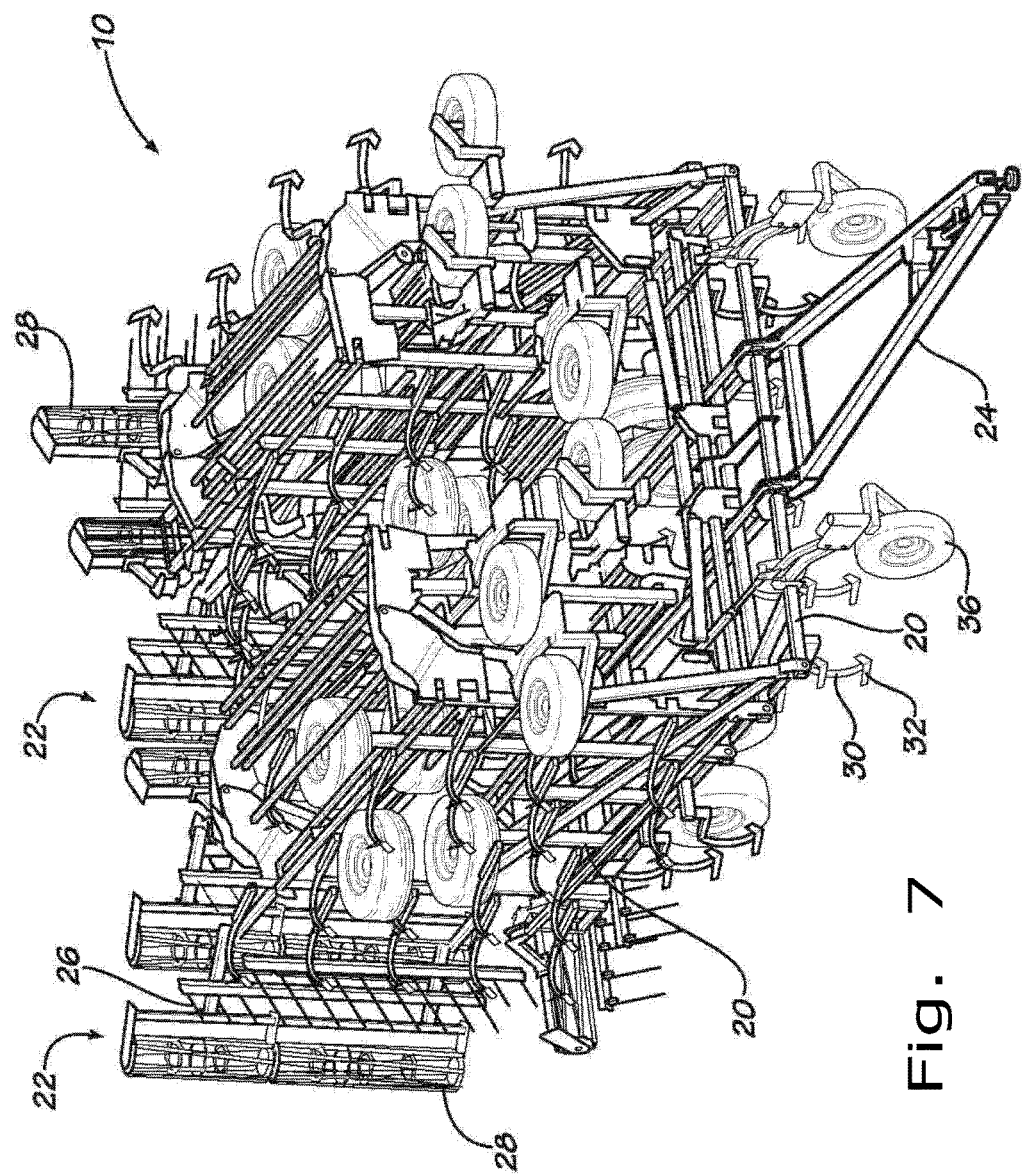
FIG. 7 is a top perspective view of the field cultivator shown in FIGS. 1-6, with the inner wing sections folded to a transport position.
Figure 8:
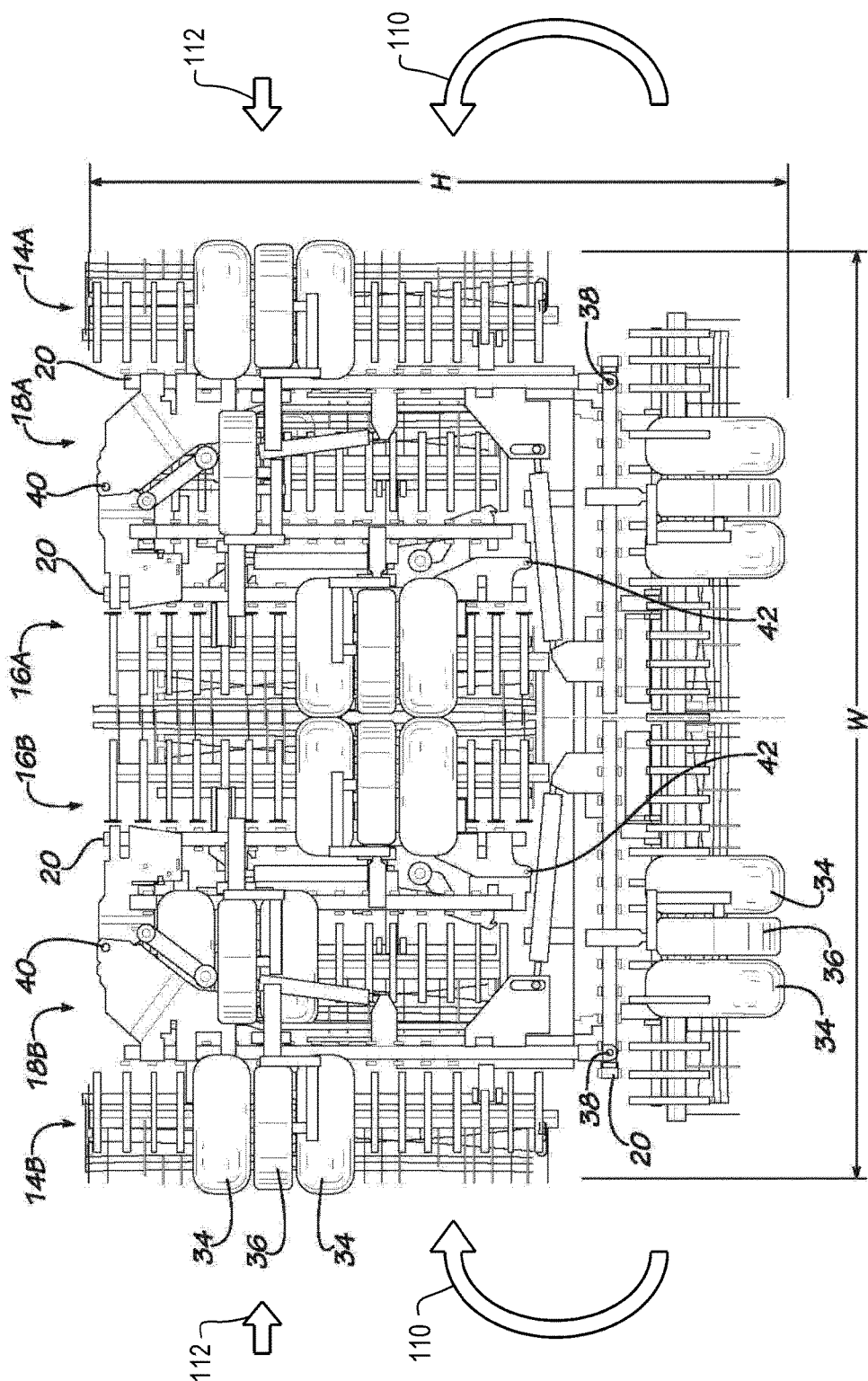
FIG. 8 is a front view of the field cultivator shown in FIG. 7, with the inner wing sections folded to the transport position.

During use, it is periodically necessary to move the field cultivator 10 from an unfolded (operating) position to a folded (transport) position. First, each outer wing section 18A and 18B is folded laterally inward and over a respective middle wing section 16A and 16B (FIGS. 3 and 4). With the outer wing sections 18A and 18B in the folded state, each middle wing section 16A and 16B is then folded laterally inward and over a respective inner wing section 14A and 14B (FIGS. 5 and 6). With the middle wing sections 16A and 16B in the folded state, each middle wing section 16A and 16B is then folded laterally inward and over the center frame section 12 (FIGS. 7 and 8). To unfold the field cultivator 10 and transform back to the field or operating position shown in FIGS. 1 and 2, the folding sequence described above is simply reversed.

The outer wing sections 18, middle wing sections 16 and inner wing sections 14 are stacked together in a vertically arranged stack over the center frame section 12 when in the folded state. To allow this type of nested stacking configuration, each of the wing sections 14, 16 and 18 have a pivot axis 38, 40 and 42, respectively, which is vertically offset to allow the wing sections to lie flat against the laterally inward shank frame 20/frame section 12 when in the folded state. The middle wing sections 16 have a pivot axis 40 that is vertically higher than pivot axes 38 and 42 of adjacent wing sections 14 and 18, when in the unfolded state.

Different countries and states have different regulatory highway requirements concerning oversized vehicles on the road. In the US, some states exempt agricultural equipment from such regulations, while others require that any type of vehicle on a road must comply with the oversized vehicle regulations. In Europe, the regulations may be stricter concerning the height and width of vehicles which may travel on a road without being accompanied by an escort vehicle. With the triple-fold field cultivator 10 of the present invention, the overall frontal profile dimensions when in the folded state fit within regulatory requirements for both the US and Europe. More particularly, with all of the wing sections 14, 16 and 18 in the folded state, the field cultivator 10 is then in a transport position with an overall frontal profile having dimensions with a maximum width "W" of no greater than approximately 20 feet, preferably approximately 18 feet wide, and a height "H" of no greater than approximately 14 feet, preferably approximately 13 feet, 6 inches high (FIG. 8).

These maximum frontal profile dimensions include all of the shank frames 20, shanks 30, rear lift wheels 34 and front gauge wheels 36, when in the folded state. The rear auxiliary implements 22 are considered to be add-ons to the main field cultivator 10, and may be outside these overall frontal profile dimensions, at least if not folded upwardly for the transport position. However, it is the intention that all of field cultivator 10, including the rear auxiliary implements 22, be within these maximum frontal profile dimensions when in the transport position.

Figure 9:
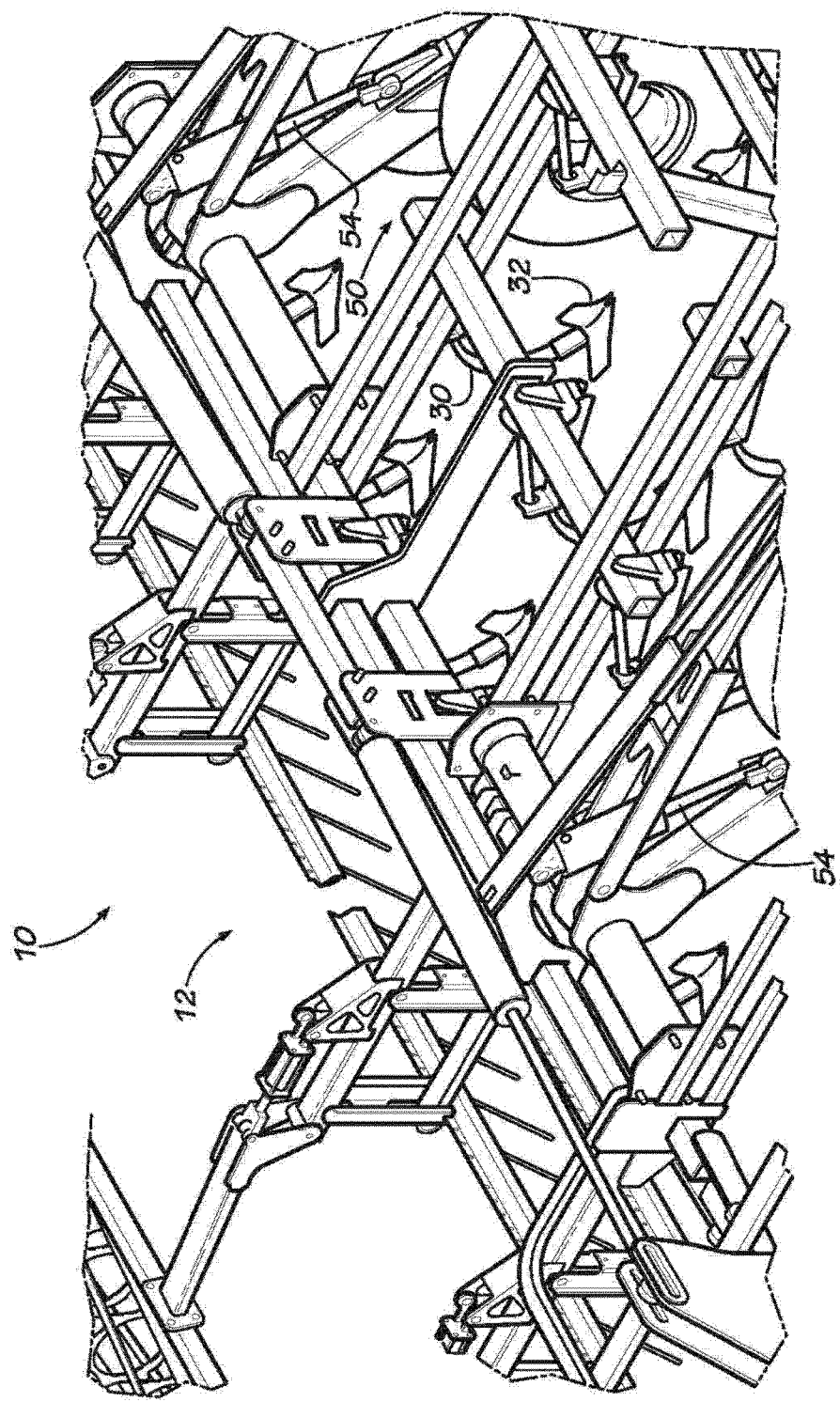
FIG. 9 is a perspective view of part of the main frame section of the field cultivator of FIGS. 1-8.
Figure 10:
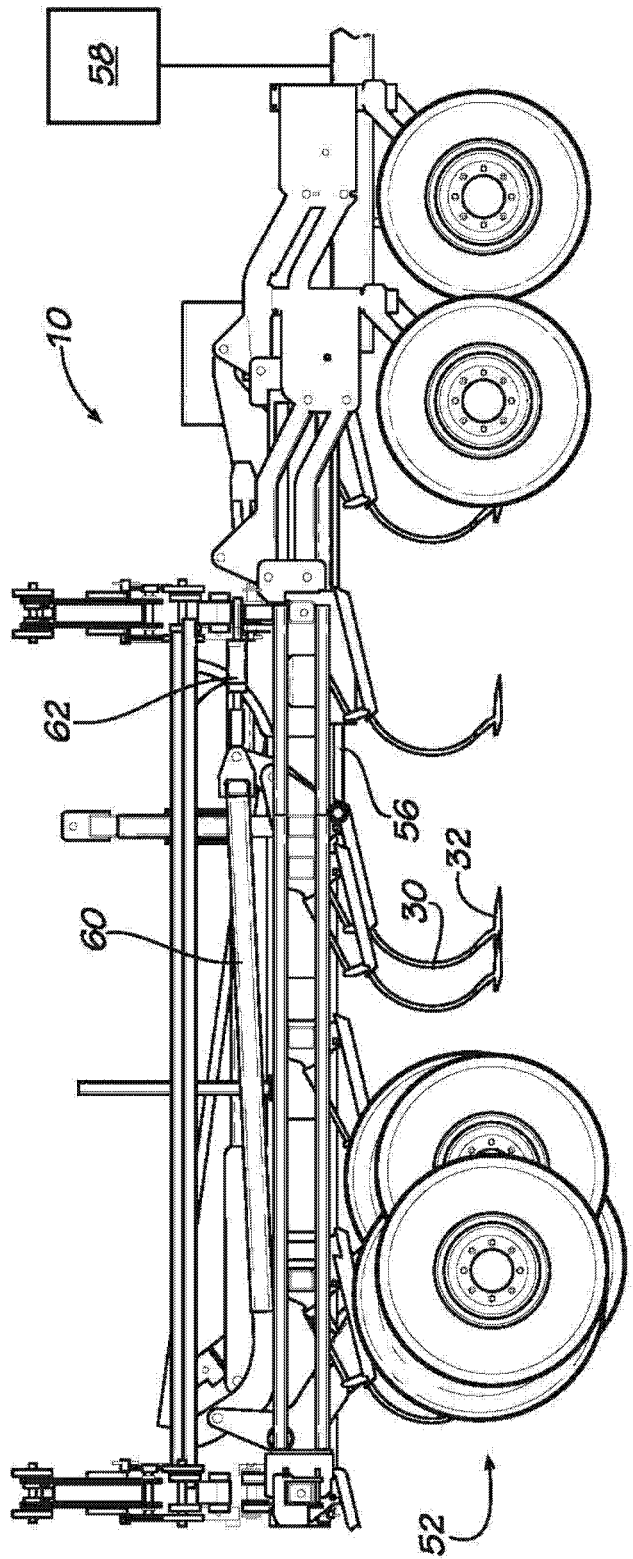
FIG. 10 is a side view of the field cultivator of FIGS. 1-9, with a primary focus on a wing section.

Now, additionally referring to FIGS. 9 and 10 there is shown further details of implement 10. Main section 12 is shown in FIG. 9 with wheel assemblies 50 having actuators 54, which provide depth level control for main section 12 when implement 10 is in field mode and support for the folded implement 10 while in transport mode.

A typical wheel assembly 52 is shown for one of the wing sections 14, 16 and 18 in FIG. 10. Wheel assemblies 52 include actuators 56, a linkage system 60 and an adjustable link 62. A controller 58 (shown abstractly in the figures) orchestrates the movement of wheel assemblies 50 and 52 in field and transport modes and during the transition to/from the field and transport modes.

Wheel assemblies 50 are shown having actuator 54 coupled more directly to the rear wheels and a linkage system is used to move the wheels that are to the fore of the rear wheels. Wheel assemblies 52 have actuator 56 positioned between the rear and fore wheels with linkage system 60 coupling both the rear and fore wheels for coordinated movement. Adjustable link 62 allows for an independent manual fore/aft leveling adjustment of each section.

Actuators 54 and 56, are under the independent and individual control of controller 58 so that sections 12-18 can each be individually adjusted for depth control of shovels 32 (which are tillage elements) of each section in a manner substantially independent of the other sections while in the field mode of operation. As implement 10 is transitioned from the field mode to the transport mode and the sections are being folded together, controller 58 causes wheel assemblies 52 to go from the fully extended position, as shown in FIG. 10 with actuator 56 fully extended, to being partially retracted (or even fully retracted) as seen in the folded wing sections of FIG. 6. This effectively lowers the profile of each wing section 14-18 as the particular wing section is folded. While controller 58 may be a set of valves manually controlled by an operator, it is contemplated that controller 58 would be an electronic control system that controls the sequence of lowering the profile of each wing section, as it is being folded by the actuators used for the purpose of folding wing sections 14-18.

Controller 58 is programmed to prevent the wheels of the folded sections from being extended by the use of manual controls (not shown), which would cause interference with adjacent sections. This preclusion of the use of manual controls prevents damage that could otherwise occur. To the extent that interference or damage can occur by the improper positioning of the wheel assemblies during the folding process, before the section is fully folded, controller 58 likewise prevents the manual controls from overriding the process undertaken by controller 58.

The present invention advantageously orchestrates the lowering of the profile of each folding wing section in order to lower the overall profile of implement 10 when implement 10 is in the transport mode. The present invention uses a control system to choreograph the transition from the field (or operational) mode to the transport mode, as the height profile of each section of wing sections 14-18 is controlled, as the sections are folded for transport and when the process is reversed as implement 10 transitions from the transport mode to the field mode.

Figure 11:
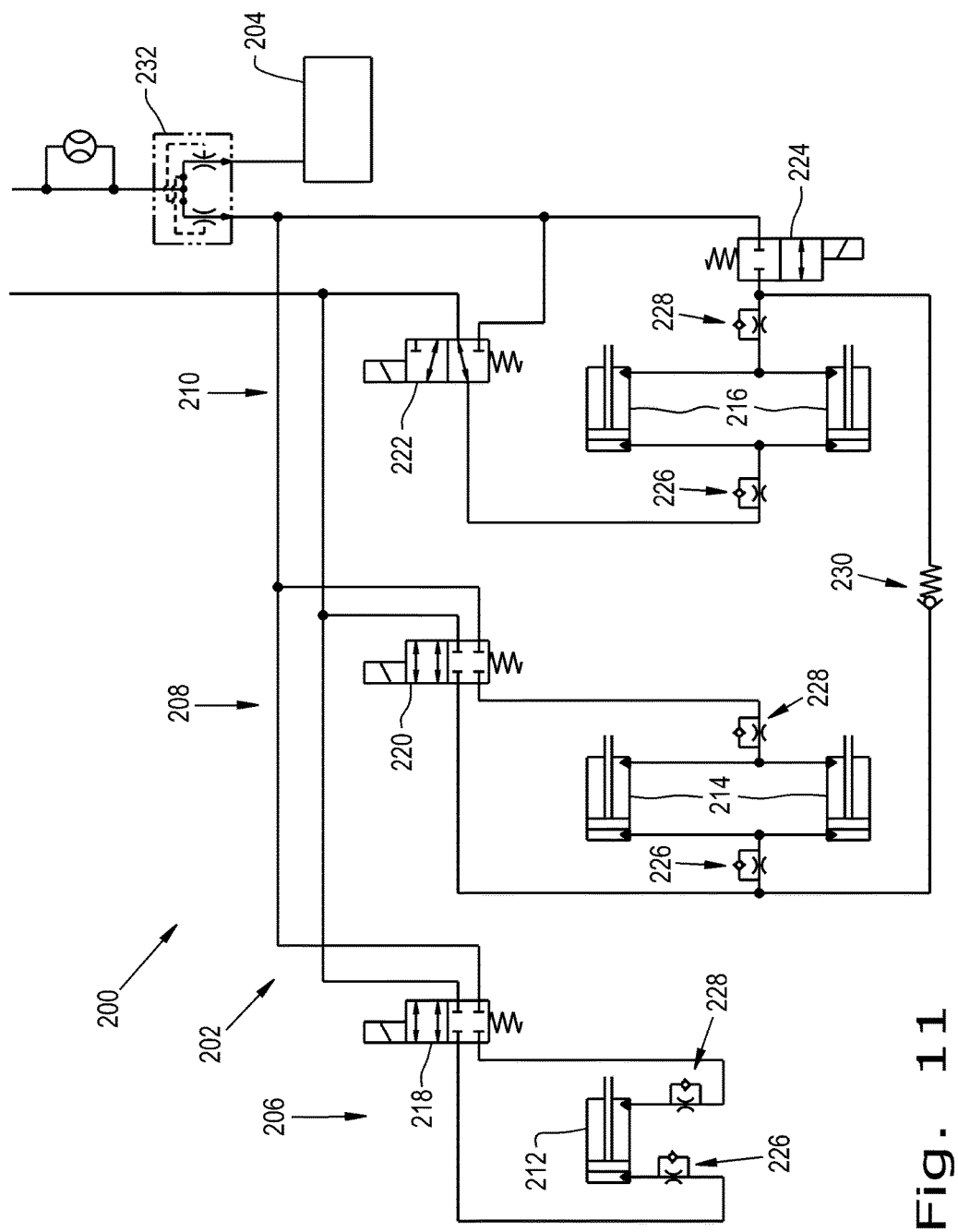
FIG. 11 is a schematic representation of part of an embodiment of a hydraulic control system of the present invention of the field cultivator of FIGS. 1-10.

Now, additionally referring to FIG. 11, there is shown a hydraulic system 200 having a left wing hydraulic subsystem 202 and a right wing hydraulic subsystem 204, which is a mirror image of left wing hydraulic subsystem 202. Hydraulic subsystems 202 and 204 each have an outer wing hydraulic circuit 206, at least one intermediate wing hydraulic circuit 208, and an inner wing hydraulic circuit 210.

Outer wing hydraulic circuit 206 includes an actuator 212, an electrically controlled valve 218 and flow controls 226 and 228. In a like manner intermediate wing hydraulic circuit 208 includes actuators 214, an electrically controlled valve 220 and flow controls 226 and 228. In a similar manner inner wing hydraulic circuit 210 includes actuators 216, an electrically controlled valve 222, flow controls 226 and 228, and a valve 224. A check valve 230 is coupled between circuits 208 and 210. A proportional flow control valve 232 is coupled to both left wing hydraulic subsystem 202 and right wing hydraulic subsystem 204, so that flow is controlled to each selected wing section on each side for a coordinated balanced action of like wing sections as implement 10 transitions between an operational mode and a transport mode or vice versa.

Flow controls 226 and 228 allow unrestricted flow into their assigned cylinder yet restrict the outgoing flow. This allows each implement section, as it reaches an over-center condition, where gravity functions to encourage the movement of the section, to be cushioned, slowed or moved in a controlled manner as that section is pivoting.

Check valve 230 is a flow circuit between intermediate wing hydraulic circuit 208 and inner wing hydraulic circuit 210 and allows for pressure to be exerted on the rod side of cylinders 216 when flow to the piston side of cylinders 214 is taking place. This forces inner wing sections 14A and 14B to remain down and not rotating as intermediate wing sections 16A and 16B are being pivoted. This advantageously effectively causes the construct to behave as a truss reducing the stress on wing hinge joints.

Valve 224 is operated in coordination with valve 222 to control the movement of inner wing sections 14A and 14B in the sequential movement of the wing sections as they transition from the transport mode to the operational mode and vice versa.

Figure 12:
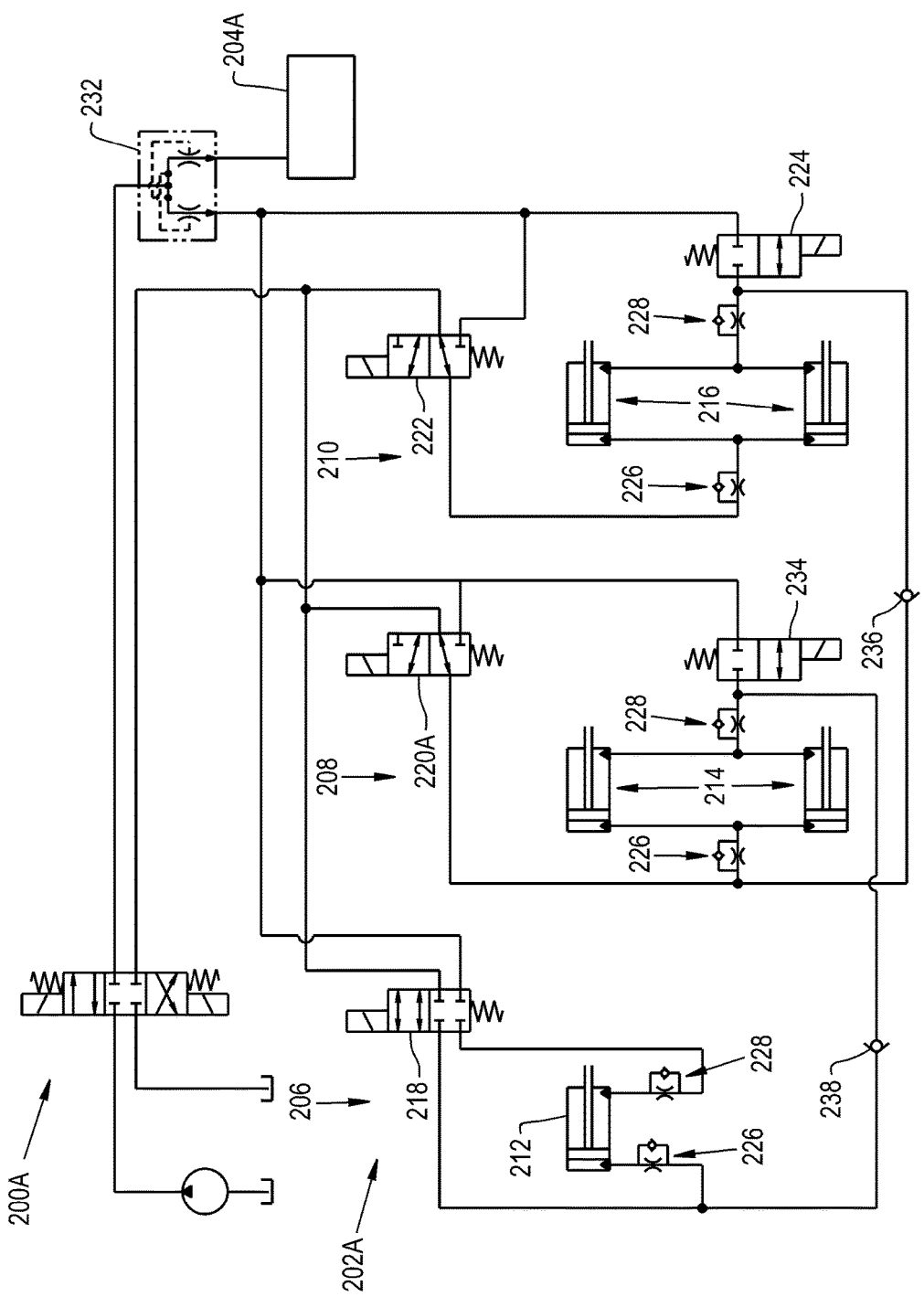
FIG. 12 is a schematic representation of part of another embodiment of a hydraulic control system of the present invention of the field cultivator of FIGS. 1-10.

Now, additionally referring to FIG. 12 there is illustrated another embodiment of a hydraulic system 200, here designated as 200A with similar elements using similar reference numbers as the previously discussed embodiment. Here there are two check valve circuits 236 and 238 that, similar to valve 230 in the previous embodiment, cause each wing section, as it is being pivoted to cause the next inner section to receive pressure to the rod side of the respective hydraulic cylinders. In this embodiment hydraulic circuit 208 has a valve 220A, and a valve 234, which makes hydraulic circuit 208 function similar to hydraulic circuit 210 of the previous and the present embodiments.

Figure 13:
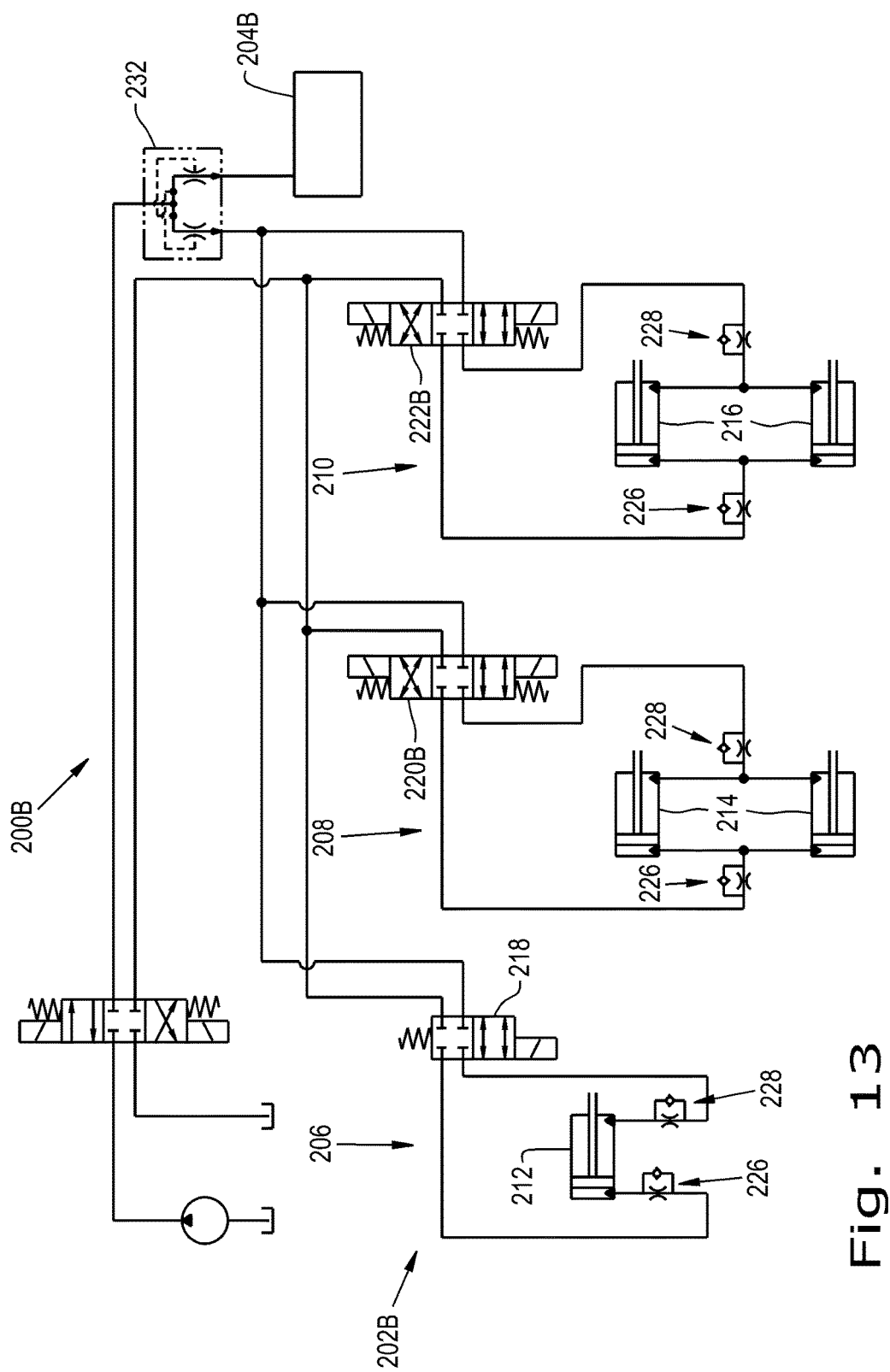
FIG. 13 is a schematic representation of part of yet another embodiment of a hydraulic control system of the present invention of the field cultivator of FIGS. 1-10.

Now, additionally referring to FIG. 13 there is illustrated yet another embodiment of a hydraulic system 200, here designated as 200B with similar elements using similar reference numbers as the previously discussed embodiments. In this embodiment three position valves 220B and 222B are used that control the flow, counter flow and isolation/blocking of flow positions.

The sequence of operations for any of the embodiments will now be discussed. As the sequence of transitioning from the field mode to the transport mode begins under the control of controller 58, wheel assemblies 52 are extended by way of actuators 54 and 56, as illustrated by arrows 100 in FIG. 2. Next, outer wing sections 18A and 18B are lifted using outer wing hydraulic circuits 206, with wheel assemblies 52 associated with outer wing sections 18A and 18B being moved in direction 102 either as out wing sections 18A and 18B are moved in direction 104, or these particular wheel assemblies may be moved in direction 102 after sections 18A and 18B are folded, all as illustrated in FIG. 4.

Next wing sections 16A and 16B are folded in by pivoting in direction 106 (see FIG. 6), by way of the activation of hydraulic circuits 208. This movement places sections 18A and 18B respectively between sections 14A and 16B; and 14B and 16B. Then wheel assemblies 52 associated with wing sections 16A and 16B are moved in direction 108, hence retracting these wheel assemblies to lower the profile associated therewith. Next wing sections 14A and 14B are moved in direction 110 (see FIG. 8) by hydraulic circuits 210 thereby placing all of the wing sections above main section 12. Then the wheel assemblies associated with inner wing sections 14A and 14B are retracted in direction 112. These coordinated actions give implement 10 a profile of height H and width W.

Figure 2:
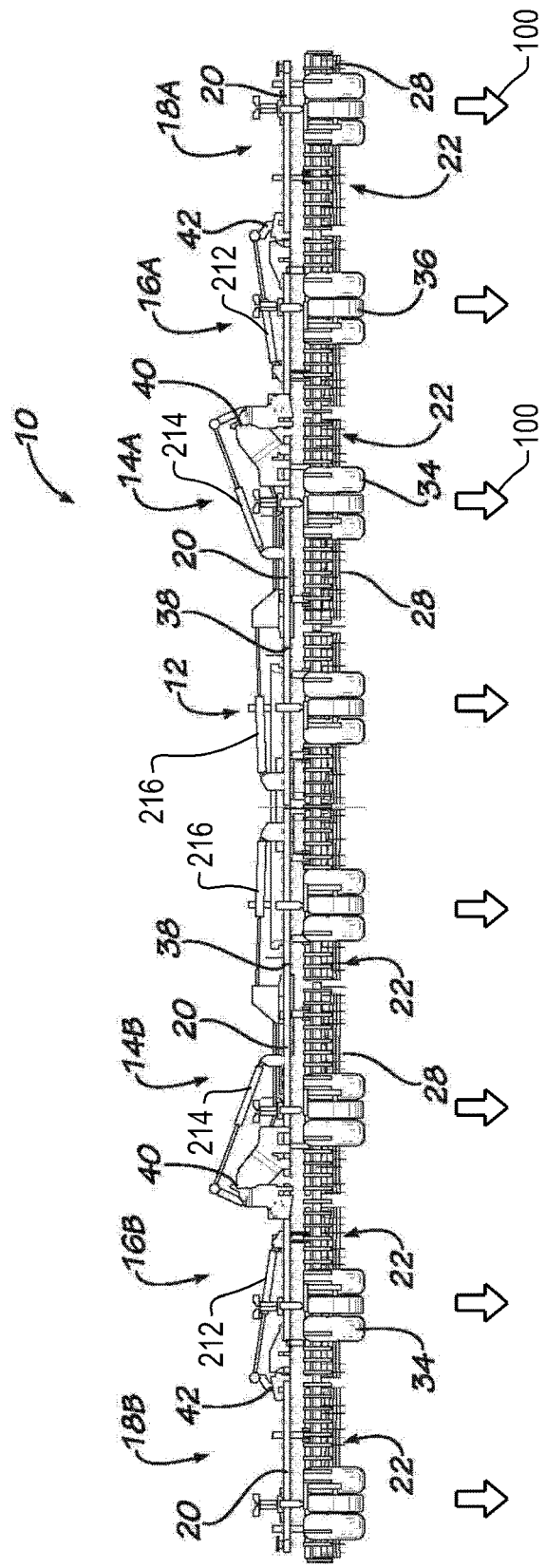
FIG. 2 is a front view of the field cultivator shown in FIG. 1.

To transition implement 10 from the transport mode shown in FIG. 8 to the operational or field mode as shown in FIG. 2 the forgoing steps are reversed. The operational control of wheel assemblies 52 is undertaken in concert with the folding/unfolding operation and takes advantage of the individual depth control system, for the movement of the wheels, which allows the tilling elements to be controlled in each wing section on an individual basis.

Figure 14:
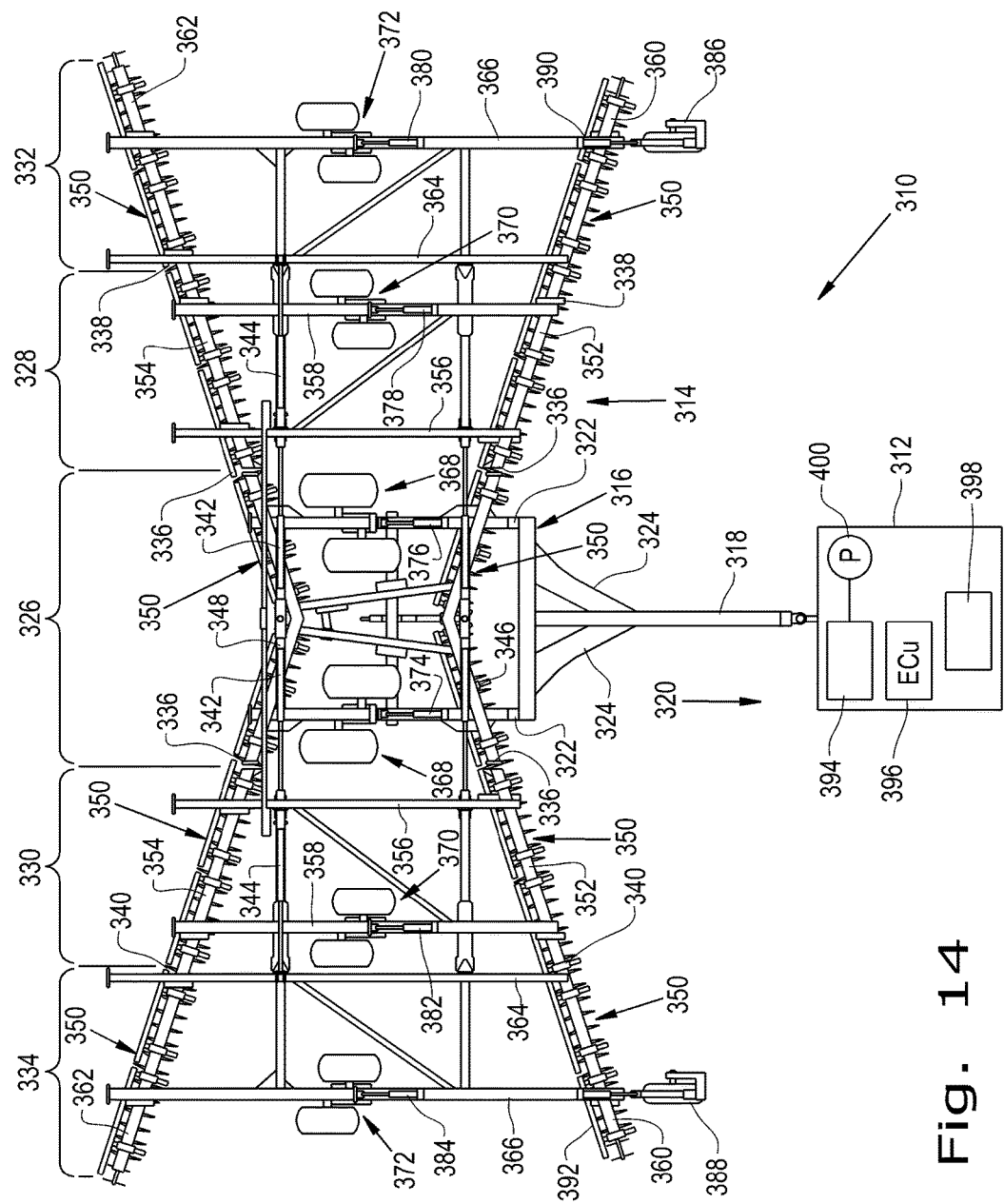
FIG. 14 illustrates a tillage implement including a support of disk blades being pulled by a tractor shown in schematic fashion.

Now, additionally referring to FIG. 14, there is shown a tillage apparatus 310 which generally includes a tractor 312 shown schematically and an agricultural tillage implement 314 for tilling the soil prior to seeding. It should be noted that many different tools may be employed with the tillage implement 314 beyond the embodiment shown. This embodiment illustrates the use of wheel positioning to control the implement and the wheel positioning aspect is used in the transition of implement 10 to/from the transport mode and field mode.

Agricultural tillage implement 314 is configured as a multi-section field disk ripper 314, and includes a carriage frame assembly 316. Carriage frame assembly 316 is the section that is directly towed by a traction unit, such as agricultural tractor 312. Carriage frame assembly 316 includes a pull hitch 318 generally extending in a travel direction 320, and forward and aft oriented carrier frame members 322 which are coupled with and extend from pull hitch 318. Reinforcing gusset plates 324 may be used to strengthen the connection between pull hitch 318 and carrier frame members 322.

The tillage implement 314 has a center section 326, an inner right wing section 330 and an outer right wing section 334 as viewed in FIG. 14. A left inner wing section 328 connects with a left outer wing section 332. The center section 326 is pivotally connected to the inner wings 328 and 330 by pivotal interconnections at 336. The right inner wing section 330 and right outer wing section 334 are pivotally interconnected at 340. The left inner wing section 328 and outer left wing section 332 are interconnected at pivotal joints 338. The details of the pivotal joints are omitted to enable a clearer understanding of the present invention. However, it should be understood that the pivotal connections allow articulation of the various sections between a field position in which each of the sections are substantially in a common plane and a transport position in which the outer wing sections 332 and 334 are folded, as well as the inner wing sections 328 and 330, to enable sufficient road clearance.

Actuator assemblies 342 are connected between the center section 326 and inner wing sections 328 and 330 to enable pivoting between the field and transport position. Actuator assemblies 344 are interconnected between right inner wing section 330 and outer right wing section 334 as well as inner left wing section 328 and outer wing section 332 to enable the pivoting movement.

The center section 326 has a forward frame member 346 extending across carrier frames 322 and secured thereto. Center section 326 additionally has an aft frame member 348 structurally interconnected with carrier frames 322 at their aft end. As is noted, the frame elements 346 and 348 extend generally laterally with respect to the direction of movement 320 of the agricultural implement. Frame members 346 and 348, however, extend at an angle as is known in the tillage art to produce appropriate working of the soil. The frame members 346 and 348 provide support beneath them for gangs of disc blades 350. The gangs of disc blades 350 are resiliently connected to the frame elements in appropriate fashion to provide smooth working of the soil.

The inner wing sections 328 and 330 each have a forward frame member 352 and an aft frame member 354. These frame members are interconnected by forward and aft oriented inner frame members 356 and outer frame members 358. The forward and aft frame members 352 and 354 form an extension of forward and aft frame members 346 and 348.

The forward and aft frame members 352 and 354 each also support gangs of disc blades 350.

The outer wing sections 332 and 334 each have forward and aft frame members 360 and 362 which each support gangs of disk blades 350. Frame members 360 and 362 are interconnected by inner frame members 364 and outer frame members 366.

The various sections 326, 328, 330, 332 and 334 of the tillage implement 314 are positioned at variable positions relative to the soil and thus set the position of the gangs of disk harrows 350 above the soil and the depth they cut into the soil. As illustrated, the variable support elements are shown as wheel sets but it should be understood that other forms of variable support may be employed. As illustrated, wheel sets 368 are pivotally interconnected with carrier frames 322 so that they provide support to the forward and aft frame members 346 and 348 relative to the soil. Wheel sets 370 are interconnected with frame element 358 to support and variably position inner wing sections 328 and 330 relative to the soil. In addition, wheel sets 372 are pivotally mounted on frame members 366 to support and variably position outer wing sections 332 and 334 at a variable distance relative to the soil. Hydraulic actuators 374 and 376 manipulate wheel sets 368 to establish the distance of center section 326 relative to the soil. Actuators 378 and 380 support and variably position sections 328 and 332 relative to the soil. Finally, actuator assemblies 382 and 384 support and variably position sections 330 and 334 relative to the soil.

In addition, castor wheel assemblies 386 on section 332 and 388 on section 334 orient the fore and aft angle of the tillage implement 314 relative to the soil. Actuators 390 and 392 are employed for this purpose.

The actuators described above are shown as hydraulic and for this purpose a hydraulic control unit 394 is mounted in the tractor 312 and has a pump 400 for pressurizing hydraulic fluid to control the actuators. The hydraulic control unit 394 receives inputs from an electronic control unit (ECU) 396 which receives various inputs set out below, in addition to an operator input through control unit 398.

Figure 15:
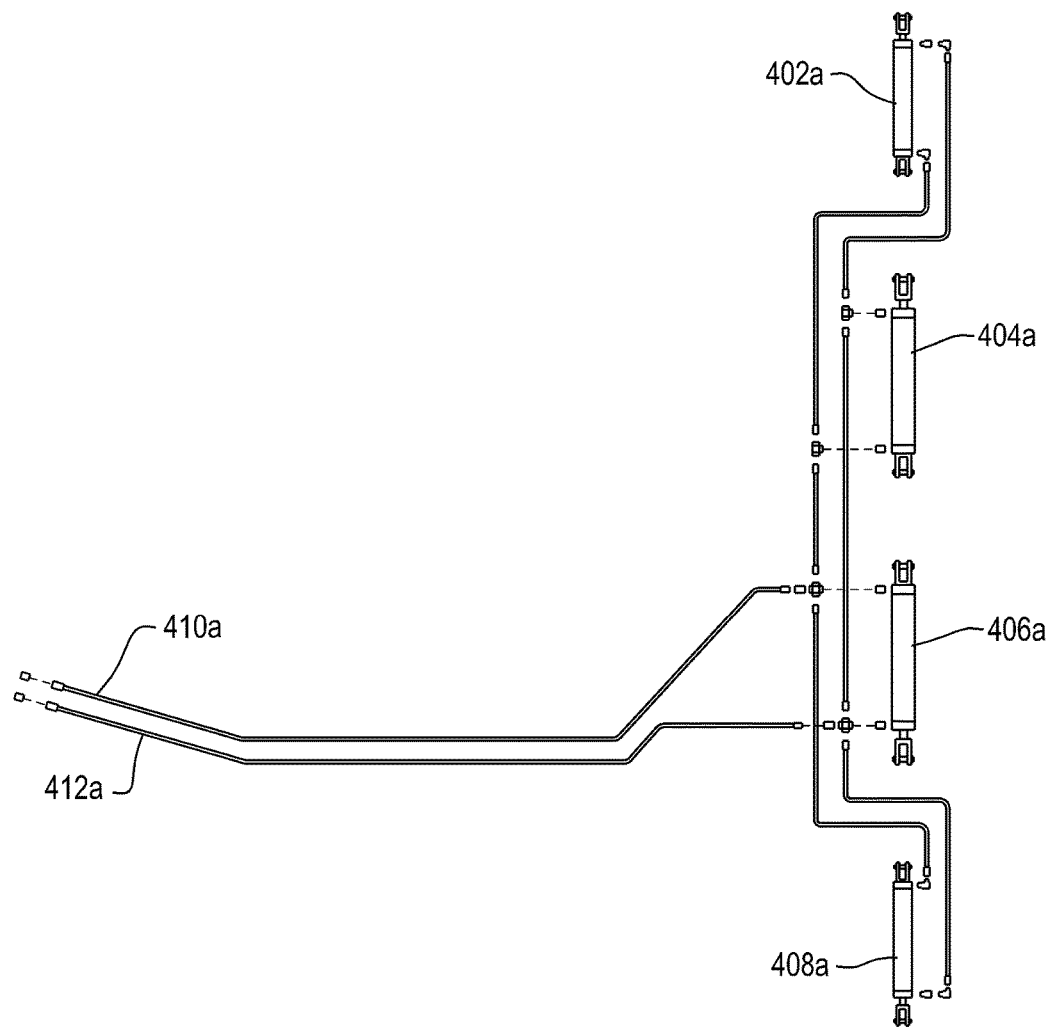
FIG. 15 is a plan view of a hydraulic system shown in the prior art for the tillage implement of FIG. 14.

The hydraulic interconnection established by a typical prior art system for elevating the various sections of the tillage implement 314 is shown in FIG. 15. In this arrangement, each of a set of actuators 402a, 404a, 406a and 408a is connected to a hydraulic control pressure by supply conduits 410a and 412a. As is illustrated in FIG. 15 the actuators 402a-408a are connected in parallel so that the pressure uniformly applies to each actuator in the set. As described above however, the actuators may become out of sync due to linkage past a piston thus requiring additional steps in the field to ensure synchronization of the actuators.

Figure 16:
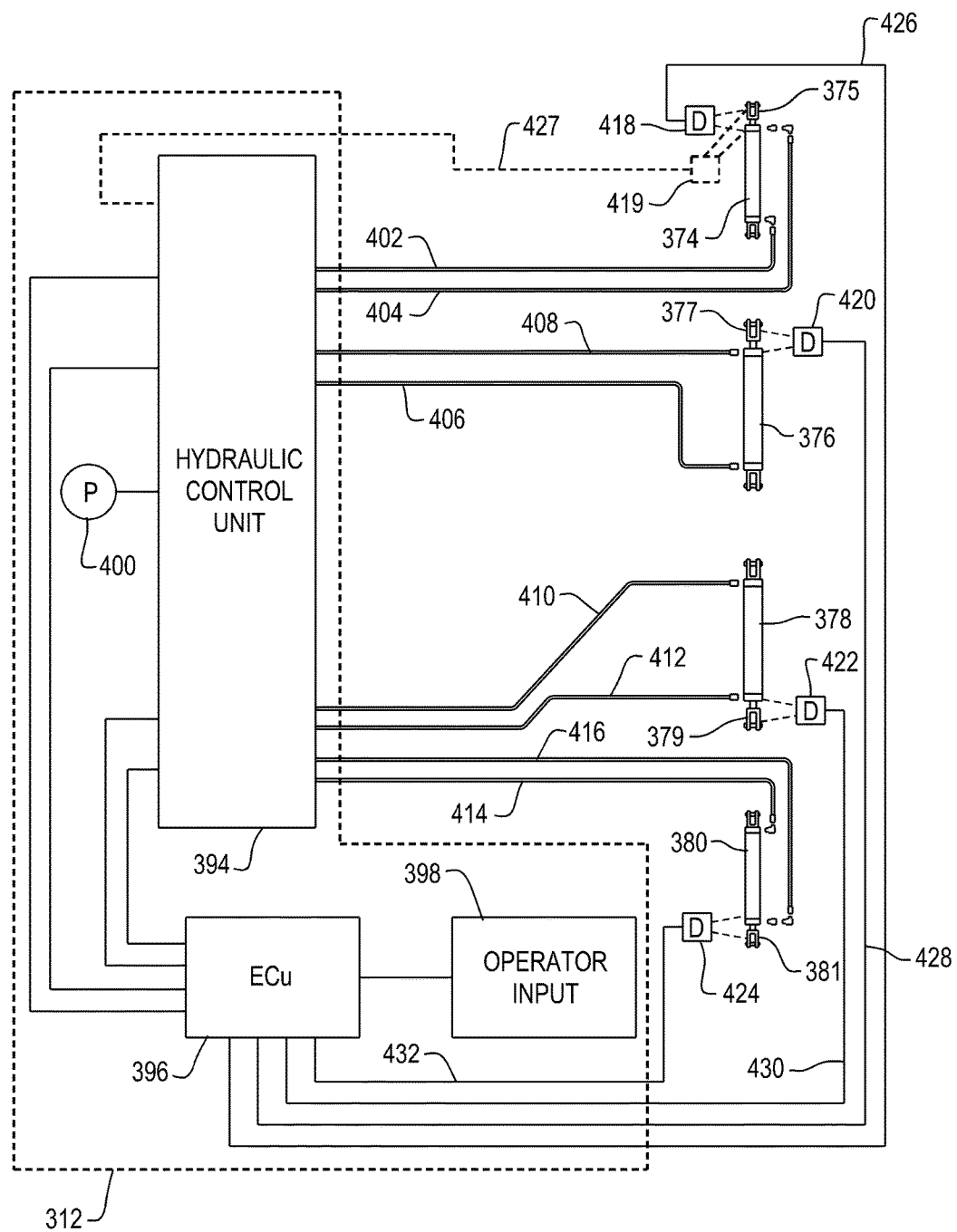
FIG. 16 is a plan view of a hydraulic system for the tillage implement of FIG. 14.

In accordance with the present invention, a control system and method set forth in FIG. 16 overcomes these difficulties. FIG. 16 shows actuators 374, 376, 378 and 380. The operation of the additional actuators is similar and is omitted to enable a better understanding of the present invention. Each of the actuators 374, 376, 378 and 380 has an output shaft 375, 377, 379 and 381, respectively extending from the actuator body. Each actuator has a piston displaceable within a chamber in the actuator body and connected to the respective output shaft.

The piston end of the actuator 374 is connected to the hydraulic control unit 394 by a hydraulic line 402. The output shaft end of actuator 374 is connected to the hydraulic control unit 394 by a return line 404. In similar fashion, the piston end of actuator 376 is connected by line 406 and a return line 408 is provided to control unit 394. The piston end of actuator 378 is connected to hydraulic control unit 394 by line 410 and the return line is designated as 412. Finally, the piston end of actuator 380 is connected to hydraulic control unit 394 via hydraulic line 414 and a return line 416 is provided. The independent connection of the actuators to the hydraulic control unit 394 will enable independent establishment of the height of the units relative to the soil.

The relative physical position of the hydraulic control unit 394 may be different than the one shown in FIG. 16, depending up on the application for the unit. It may be a single module or may be provided in individual control sections. However, the hydraulic control unit 394 is positioned relative to the actuators, it permits independent manipulation of the actuator output shafts as will be described below.

For this purpose, a displacement detecting device is provided to provide a signal proportional to the displacement of each output shaft relative to the body of the respective actuator. In addition to the displacement signal, a signal reflecting the rate of change of displacement or Δ D/Δ T is provided. The displacement indicating devices are identified as 418 for actuators 374, 420 for actuators 376, 422 for actuator 378 and 424 for actuator 380. The displacement indicating devices 418, 420, 422 and 424 provide signal inputs to the ECU via lines 426, 428, 430 and 432, respectively. The displacement indicating devices are devices that provide appropriate control signals that are proportional to the displacement of the output shaft relative to the various actuators and preferably the rate of change of displacement. The interconnections with the output shafts and actuators are not included to enable a better focus on the basic principle of the invention. Any one of a number of sensors may be employed for this purpose.

As shown, the displacement sensors and Δ D/Δ T sensors are incorporated into a single unit. However, the Δ D/Δ T signal may be provided in a separate unit 419 shown in dashed lines for actuator 374. Unit 419 may be connected to ECU 396 by a line 427, also shown as a dashed line. Similar units would be provided for actuators 376, 378, and 380 if it is desired to use separate units for displacement and Δ D/Δ T signals.

The invention is applied to the tillage implement of FIG. 14 by initially setting the implement on a level surface for calibration. The implement 314 is raised to the maximum extent where each individual actuator has its output shaft at its maximum length. At this point, a bypass port in the piston provides a bypass for return flow back to the actuator control unit 394. This ensures that any air entrained in the system due to assembly or other reason is passed to the hydraulic system. The implement 314 is then lowered so that the tools, in this case the gangs of disk blades 350, just touch the level surface. Preferably this surface would be a level concrete surface. Once the actuators are adjusted to reach this point, individual readings of the displacement between the actuator rod and the actuator body are taken with full hydraulic fluid in the chambers. The displacement signals of the individual actuators are stored in the ECU 396. The resultant individual actuator displacement signals are considered the synchronized set point for the signals. It should be apparent to those skilled in the art that the use of placing the tools at the plane of the soil is but one of a number of reference points that define a unitary plane used in defining the reference plane.

The tillage implement is then in a position to have each of the actuators raise and lower the individual frame elements in unison to provide a uniform height above the ground and a uniform depth when the gangs of disk blades 350 are positioned in the soil. Periodically during the operation of the tillage implement, the readings of the individual actuators are determined and, if they deviate from the set point initially established, the hydraulic control system provides appropriate hydraulic fluid to achieve the same set point. This is done independently of the other actuators so that correction is applied individually to each actuator unit. The tillage implement 314 is then able to provide accurate depth of penetration among the gangs of disk harrows 350.

The implement may be adjusted additionally in the field. In this procedure, the operator prepares a test run into the soil in a field and then measures the depth of the penetration of the disk blades. To the extent that it is necessary to make a minor adjustment, the individual cylinder that is out of sync with the remaining cylinders is adjusted and a new set point is established as the level uniform plane. This ensures that field conditions such as wheel loading and other factors have a minimal and easily correctable impact on the tillage operation.

In addition, the actuators are corrected for the differential rate of displacement change by the Δ D/Δ T so that the entry of the gangs of disk blades 350 is uniform at the beginning of the field and the withdrawal is uniform at the end of the field. The process of recalibration may be made automatic so that it does not interfere with the immediate operator directed tillage over a field and preparing the soil.

The hydraulic system illustrated in FIGS. 17-22 illustrates a preferred hydraulic system for the tillage implement of FIG. 14. The system shown in FIGS. 17-22 is described by specifically referring to FIG. 17. The system will be explained by using actuators 374, 376 and 378. The additional actuator or actuators are omitted from the description to enable a clearer understating of the invention. The pump for pressurizing the hydraulic fluid is designated as 400 and the hydraulic control unit 394 schematically shown in FIG. 16 is connected to the actuators as will be explained below. A dashed line designated as 394 is used to indicate the valves and lines below are also part of the hydraulic control unit. In this system there is a hydraulic line 480 connected to the hydraulic control unit 394 and a second hydraulic line 482 for hydraulic fluid between the actuators and the hydraulic control unit 394. In this system the line 480 connects to a first three-way valve 484 and line 486 which is connected to the piston end 488 of actuator 374. The output shaft end 490 of actuator 374 has a line 492 leading to an additional three-way valve 494. From there a line 496 extends to the piston end 498 of actuator 376. The output shaft end 500 of actuator 376 has a line 502 extending to a third three-way valve 504. Finally, a line 506 extends to the piston end 508 of actuator 378. A line 510 at the output shaft end of actuator 378 connects with line 482 leading to the hydraulic control unit 394. Bypass line 512 leads from three-way valve 484 and has a connecting line 514 to valve 594 and a connecting line 516 to three way valve 504.

The three-way valves are each set up so that when they are de-energized there is flow from the adjacent hydraulic line to the respective piston end of the associated actuator. In other words, when valves 484, 594 and 504 are de-energized, the flow is from line 480 to 486, 492 to 496, and 502 to 506, respectively. When each solenoid valve or three-way valve is energized there is flow between the adjacent hydraulic line and the bypass line. In other words, when valve 484 is energized, flow to 486 is blocked and flow is directed from line 480 to line 512. Correspondingly, when valve 494 is energized, the flow is from line 492 to line 514 with the flow to 496 blocked. Finally, when valve 504 is energized, the flow is from line 502 to line 516 with the line 506 blocked.

The sensors 418, 420 and 422 are employed to measure the actual displacement of output shaft 375, 377 and 379 but are not shown in these figures to aid in the understanding of the invention. There are signal inputs from the ECU 396 to the valves and these are made through line 520 for valve 484, line 522 for valve 594 and line 524 for valve 504.

Figure 17:
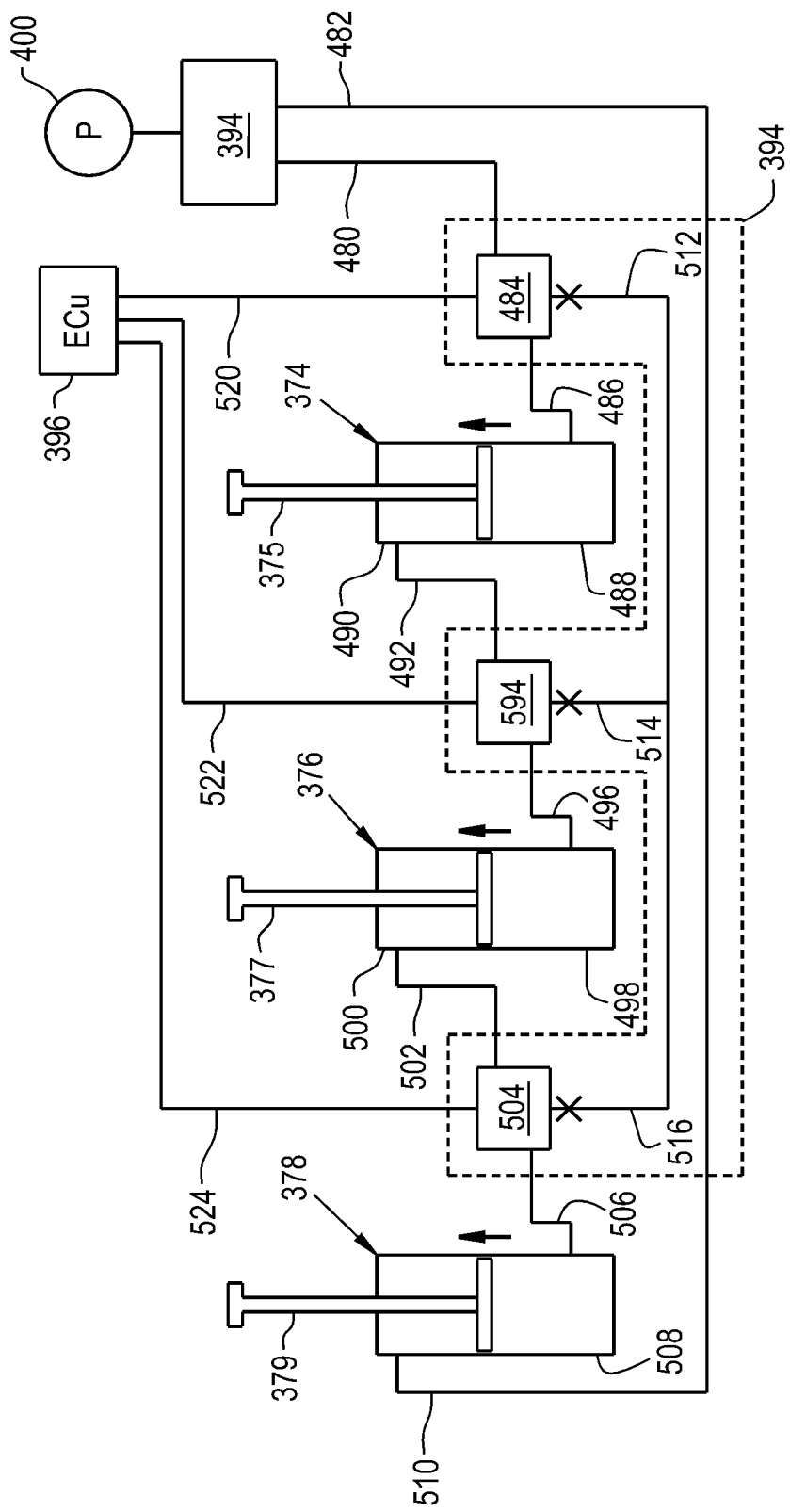
FIG. 17 is a plan view of a preferred hydraulic system for the tillage implement of FIG. 14 in a first state; and, FIGS. 18-22 show the hydraulic system of FIG. 17 in different states.
Figure 18:
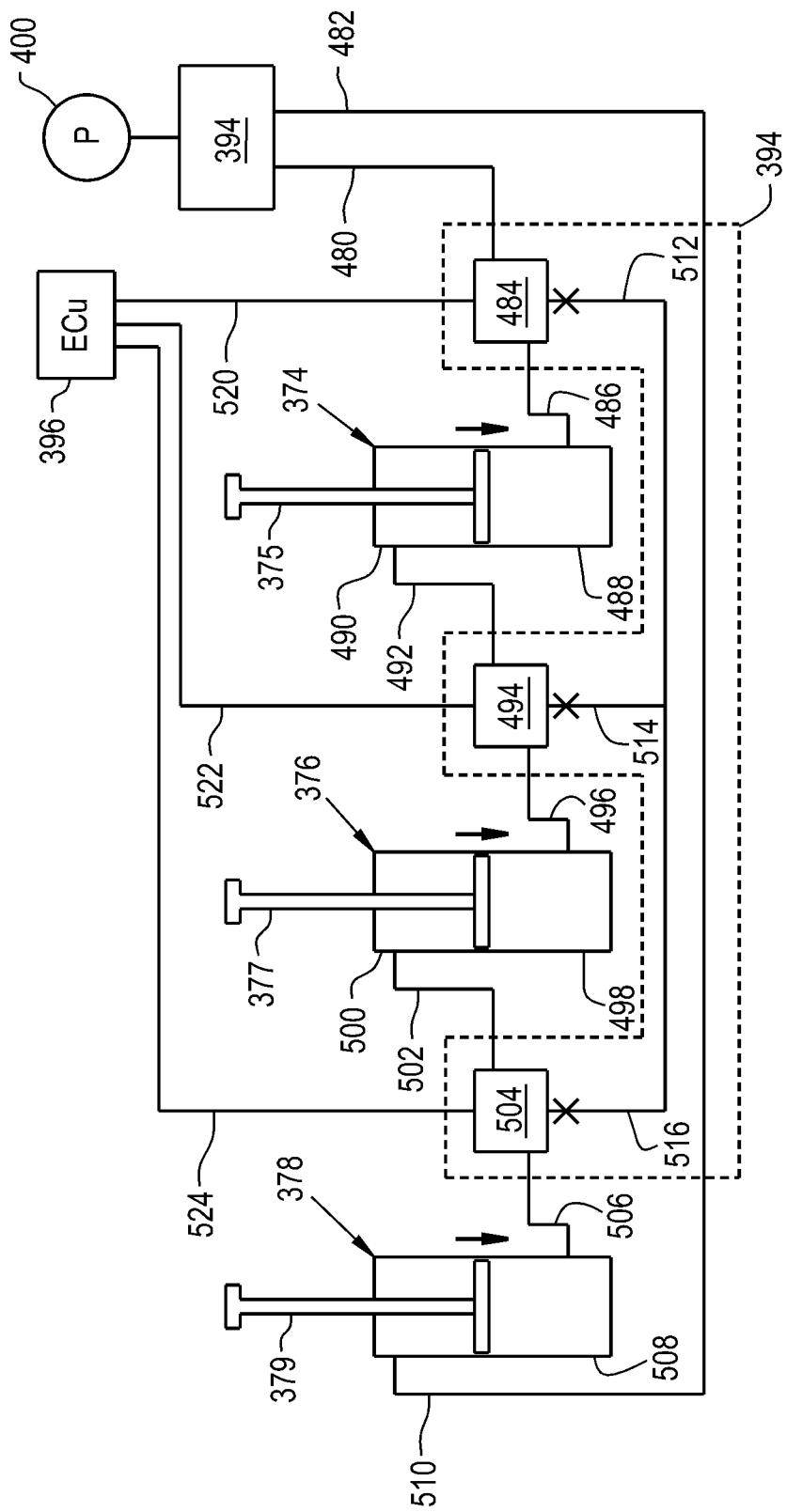
Figure 19:
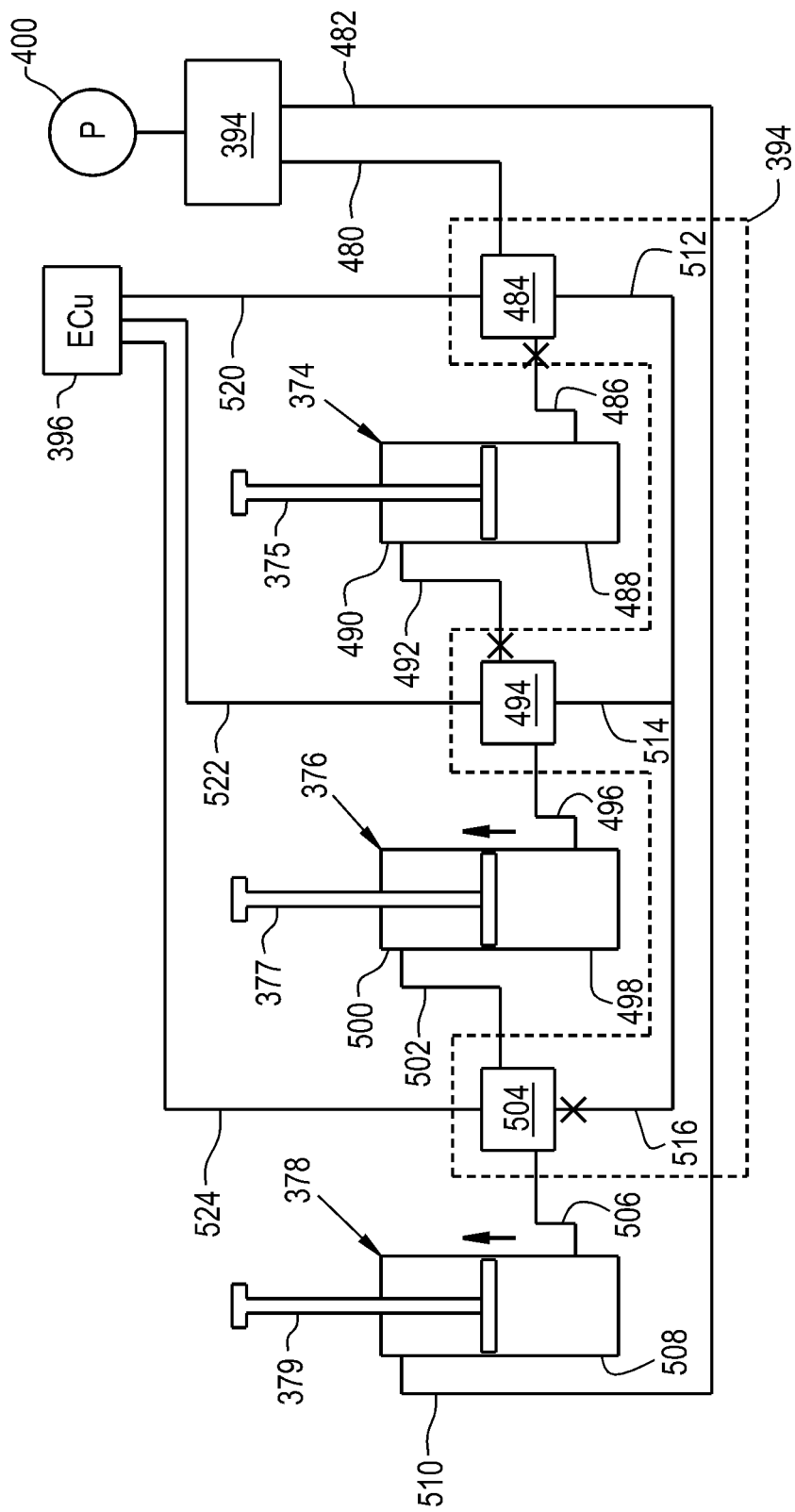

The arrangement set forth above enables a traditional series connection between the actuators but with the possibility to minimize the number of hydraulic lines deployed on the carrier frame and still retain the ability to provide individual adjustment. FIG. 17 shows the state where actuator 374 is to be adjusted. In this case, the valves 484, 594 and 504 are all de-energized so that the flow to the piston end 488 of actuator 374 causes the output shaft to be adjusted in accordance with the signals of the corresponding sensor. Since actuators 376 and 378 are also in series, they move also. The view of FIG. 17 shows a movement of the output shaft 375 toward extension and the view in FIG. 18 shows the shaft 375 retracting. In this case, the output shafts 377 and 379 retract also.

Figure 20:
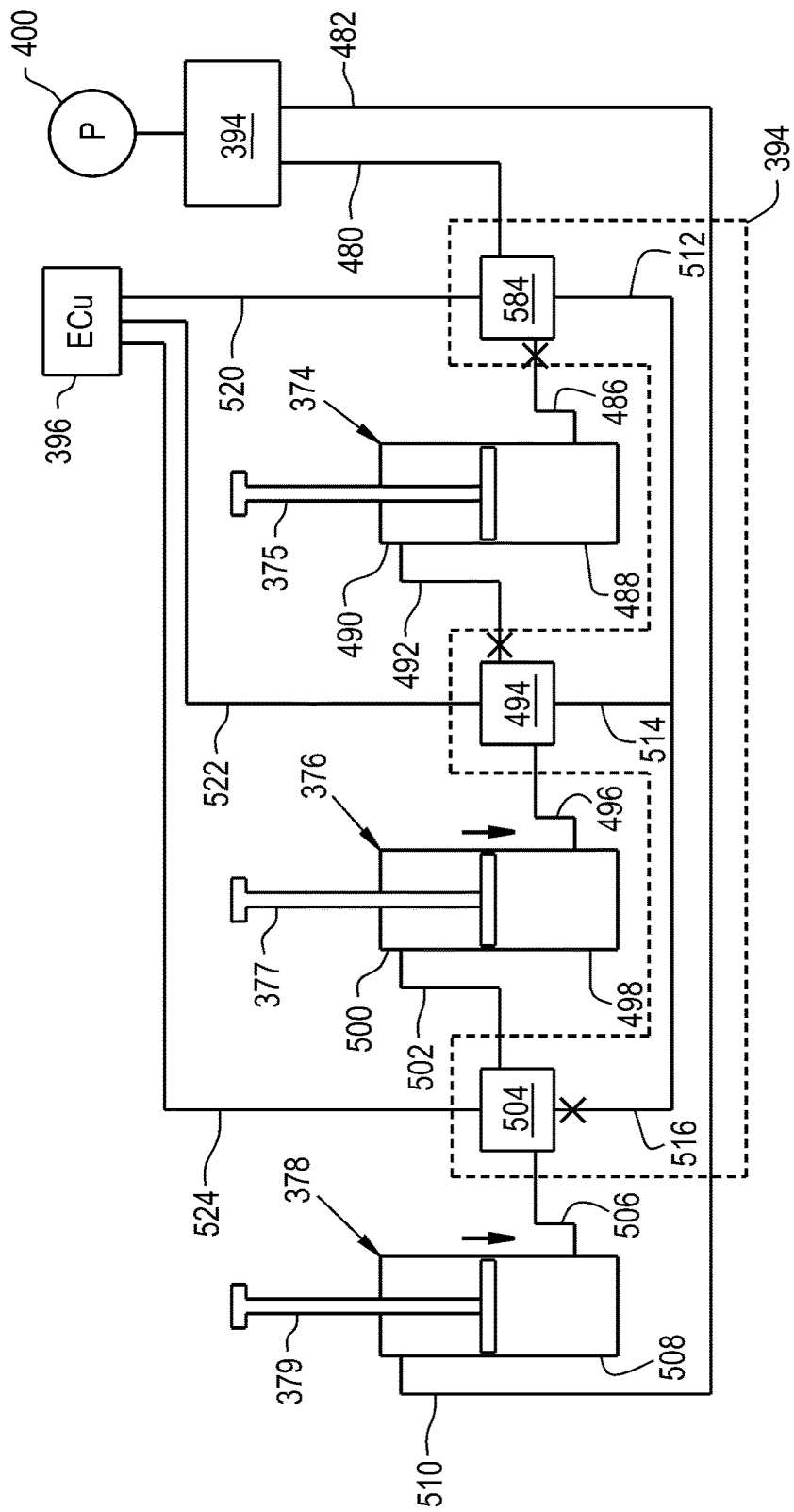

Once the cylinder 374 is adjusted, the system moves to actuator 376. In this condition, shown in FIG. 19, valve 484 is energized so that flow to the piston end 488 of actuator 374 is blocked and the flow passes through line 412. In this case, the solenoid 494 is en ergized so that flow occurs between line 514 and 496 to the piston end 498 of actuator 376. This causes the hydraulic flow from the actuator to be applied to the output shaft to move the output shaft 377 towards extension. At the same time the output shaft 379 of actuator 378 moves with it. The view in FIG. 20 shows the condition when the actuator is moving in a position to retract output shaft 377. In this case, the flow is back through line 512 and to the hydraulic control unit 394 through line 480.

Figure 21:
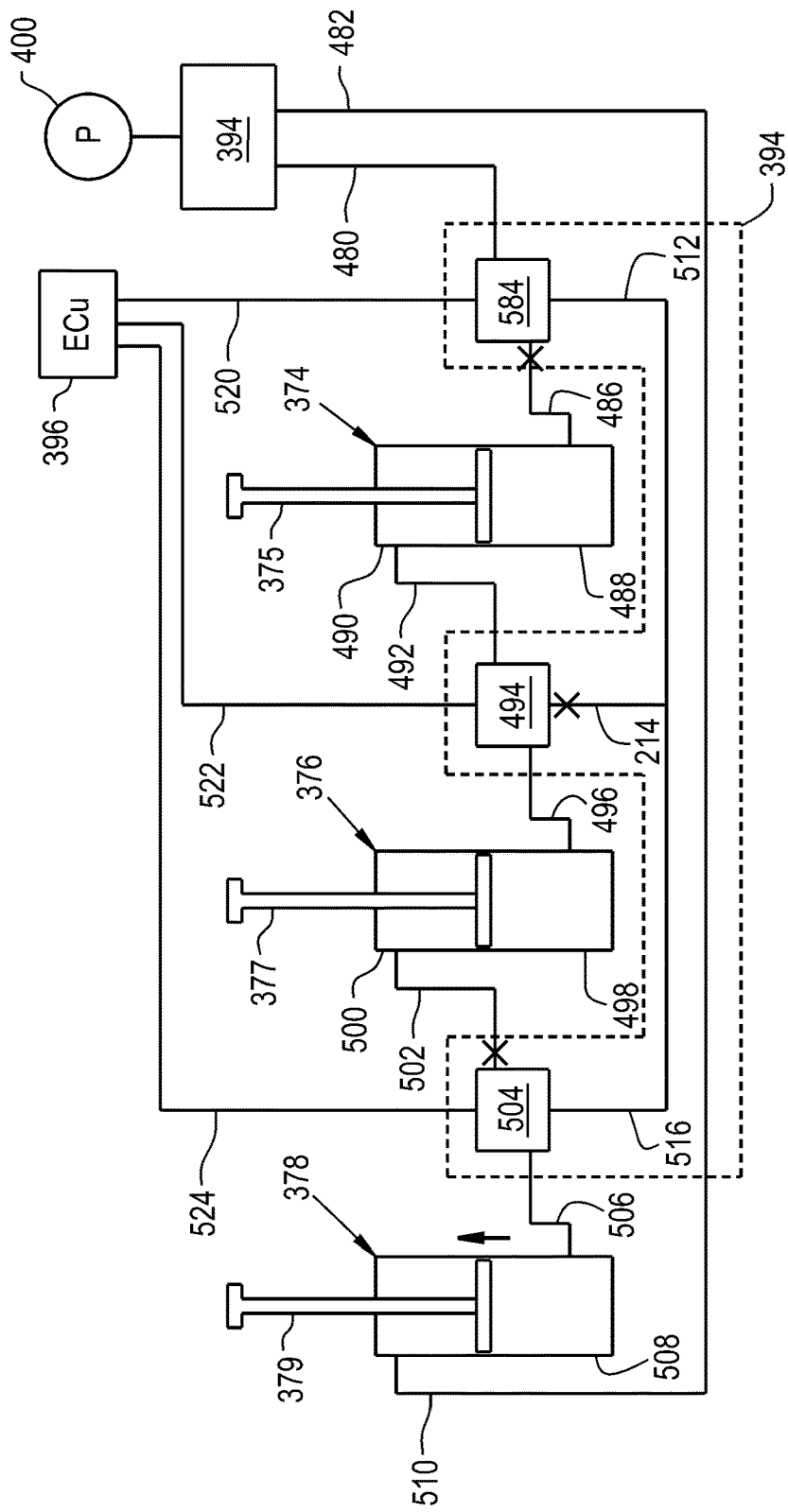
Figure 22:
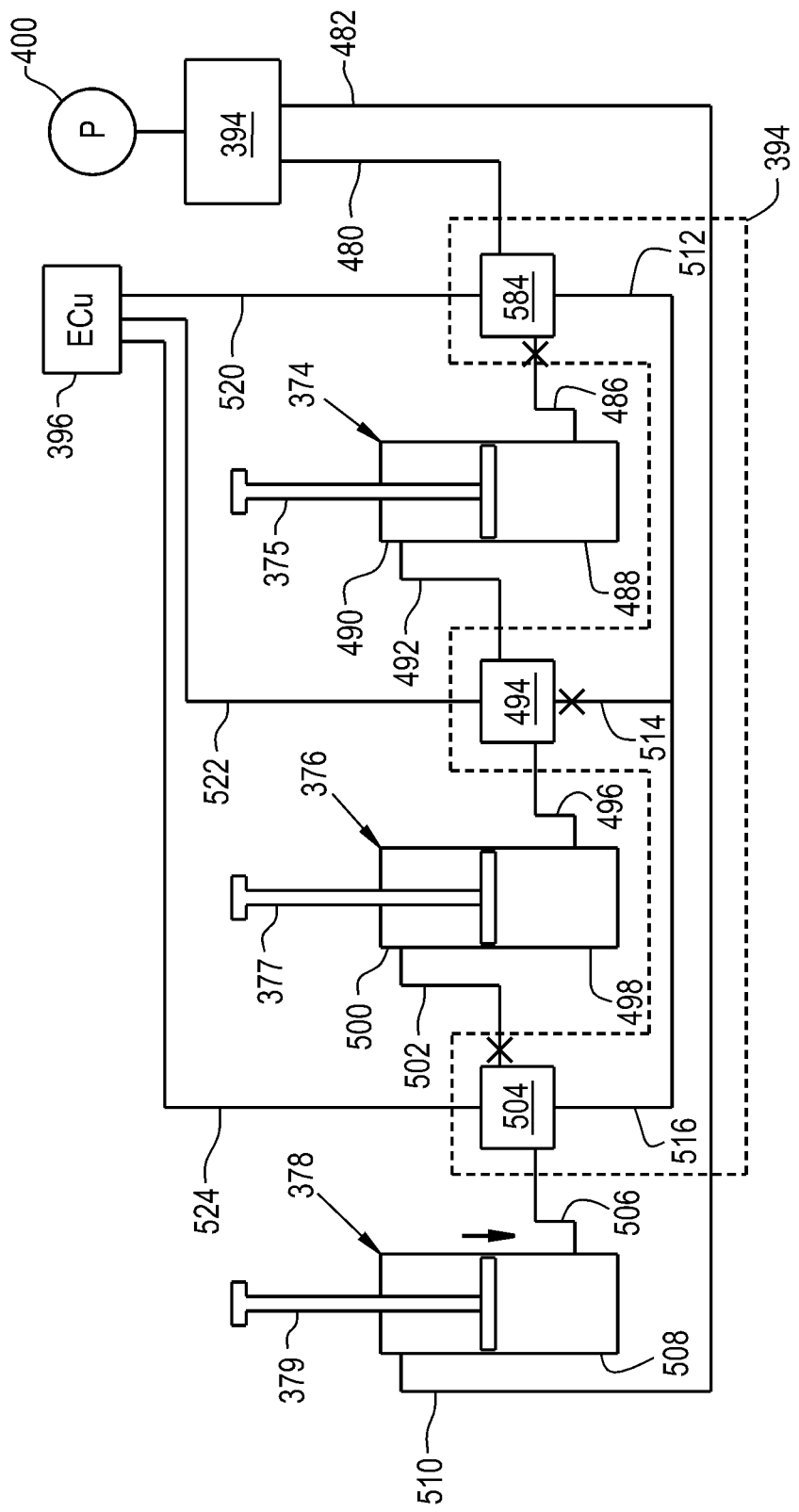

Once this is done, the actuator 378 is to be adjusted and in this case the actuator 374 and 376 are locked so that the flow is by line 512 to through valve 504 to the piston end 508 of actuator 378. FIG. 21 shows the output shaft 379 in an extension mode and FIG. 22 shows the output shaft 379 in a retracting mode. Once the actuator 378 is adjusted the valves 484, 494 and 504 are de-energized so that the actuators 374, 376 and 378 may act in unison as in a series connection. For additional actuators, the procedure for adjustment follows the same steps until all actuators are adjusted. The above system and method enables individual adjustment of the actuators, but with the traditional series connection between the actuators and resultant minimization of the hydraulic lines on the tillage implement.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
   a main section including a pull hitch extending in a travel direction;
   a plurality of foldable wing sections coupled with the main section, the plurality of foldable wing sections including an outer left wing section and an outer right wing section, each of the foldable wing sections including an actuator for moving the associated wing section;
   a plurality of ground engaging tilling elements coupled to one of the main section and to the plurality of foldable wing sections;
   a plurality of wheel assemblies, each wheel assembly including an actuator, the plurality of wheel assemblies including a first plurality of wheel assemblies associated with the main section and a second plurality of wheel assemblies associated with the plurality of wing sections;
   a hydraulic system having a left wing hydraulic subsystem and a right wing hydraulic subsystem, the left wing hydraulic subsystem including an outer left wing hydraulic circuit for actuating the actuator of the outer left wing section, the right wing hydraulic subsystem including an outer right wing hydraulic circuit for actuating the actuator of the outer right wing folding section; the hydraulic system additionally having at least one hydraulic flow divider dividing hydraulic flow and pressure between the outer left wing hydraulic circuit and the outer right wing hydraulic circuit, the at least one hydraulic flow divider being configured to coordinate the motion of the outer left wing section and the outer right wing section; and
   a displacement detecting device positioned on each actuator of each of the plurality of foldable wing sections, the displacement detecting device including
      a first signal proportional to a displacement of an output shaft relative to a body of the actuator of each respective foldable wing section, and
      a second signal which reflects a rate of change of displacement of the output shaft of the actuator, so that the plurality of foldable wing sections and the plurality of ground engaging tilling elements connected thereto are raised and lowered via the actuators in unison and calibrated via the displacement detecting device to provide a uniform height above the ground for the plurality of foldable wing sections and a uniform depth for the plurality of ground engaging tilling elements when positioned in the soil, wherein the calibration includes the agricultural tillage implement 1) positioned on a level surface, 2) the plurality of wing sections raised to the maximum extent wherein each individual actuator of each wing section has its output shaft extended to a maximum length, and 3) the wing sections lowered so that the plurality of ground engaging tilling elements on each wing section just touch the level surface.

2. The agricultural tillage implement of claim 1, wherein the plurality of foldable wing sections including an intermediate left wing section and an intermediate right wing section, the left wing hydraulic subsystem further includes an intermediate left wing hydraulic circuit for actuating the actuator of the intermediate left wing section, the right wing hydraulic subsystem including an intermediate right hydraulic circuit to actuate the actuator of the intermediate right wing section; the hydraulic flow divider dividing hydraulic flow and pressure between the intermediate left wing hydraulic circuit and the intermediate right wing hydraulic circuit, the hydraulic flow divider being configured to coordinate the motion of the intermediate left wing section and the intermediate right wing section, and wherein when the plurality of wing sections are raised to the maximum extent such that each individual actuator of each wing section has its output shaft extended to the maximum length, a bypass port in each actuator piston provides a bypass for return flow back to the actuator control unit which ensures that any air entrained in a chamber of one of the plurality of actuators or in a connected hydraulic line of one of the plurality of actuators is passed to the hydraulic system.

3. The agricultural tillage implement of claim 2, wherein the hydraulic system is configured to sequentially actuate the outer wing hydraulic circuits then the intermediate wing hydraulic circuits when transitioning from an operational mode to a transport mode.

4. The agricultural tillage implement of claim 2, wherein the plurality of foldable wing sections including an inner left wing section and an inner right wing section, the left wing hydraulic subsystem further includes an inner left wing hydraulic circuit for actuating the actuator of the inner left wing section, the right wing hydraulic subsystem including an inner right wing hydraulic circuit for actuating the actuator of the inner right wing section; the hydraulic flow divider dividing hydraulic flow and pressure between the inner left wing hydraulic circuit and the inner right wing hydraulic circuit, the hydraulic flow divider being configured to coordinate the motion of the inner left wing section and the inner right wing section.

5. The agricultural tillage implement of claim 4, wherein the hydraulic system is configured to sequentially actuate the outer wing hydraulic circuits then the intermediate wing hydraulic circuits then the inner wing hydraulic circuits when transitioning from an operational mode to a transport mode.

6. The agricultural tillage implement of claim 4, wherein the hydraulic system is configured to sequentially actuate the inner wing hydraulic circuits then the intermediate wing hydraulic circuits then the outer wing hydraulic circuits when transitioning from a transport mode to an operational mode.

7. The agricultural tillage implement of claim 4, wherein the hydraulic system further includes at least one hydraulic connection between the outer wing hydraulic circuits and the inner wing hydraulic circuits.

8. The agricultural tillage implement of claim 4, wherein the hydraulic system further includes at least one hydraulic connection between the intermediate wing hydraulic circuits and the inner wing hydraulic circuits.

9. The agricultural tillage implement of claim 4, wherein the hydraulic system further includes at least one hydraulic connection between the intermediate wing hydraulic circuits and the outer wing hydraulic circuits.

10. The agricultural tillage implement of claim 4, wherein the hydraulic flow divider is configured to divide the hydraulic fluid flow for each of the outer wing hydraulic circuits, the intermediate wing hydraulic circuits and the inner wing hydraulic circuits.

* * * * *